US009153130B2

(12) United States Patent
Iwahori et al.

(10) Patent No.: US 9,153,130 B2
(45) Date of Patent: Oct. 6, 2015

(54) INFORMATION UPDATING DEVICE, INFORMATION DISTRIBUTING DEVICE, INFORMATION PROCESSING SYSTEM, METHOD THEREOF, PROGRAM THEREOF, AND STORAGE MEDIUM STORING THE PROGRAM

(75) Inventors: Yasufumi Iwahori, Tokyo (JP); Yoshihide Hamaguchi, Kawagoe (JP); Yasushi Kikuchi, Sagamihara (JP); Ryota Shitamatsu, Kawasaki (JP); Hiroyuki Kashima, Machida (JP)

(73) Assignees: PIONEER CORPORATION, Tokyo (JP); INCREMENT P CORPORATION, Tokyo (JP); NISSAN MOTOR CO., LTD., Yokohama-shi (JP)

( * ) Notice: Subject to any disclaimer, the term of this patent is extended or adjusted under 35 U.S.C. 154(b) by 2320 days.

(21) Appl. No.: 11/289,786

(22) Filed: Nov. 30, 2005

(65) Prior Publication Data

US 2006/0161344 A1 Jul. 20, 2006

(30) Foreign Application Priority Data

Dec. 2, 2004 (JP) ................................ 2004-350161

(51) Int. Cl.
*G01C 21/32* (2006.01)
*G06F 17/30* (2006.01)
(Continued)

(52) U.S. Cl.
CPC .......... *G08G 1/096716* (2013.01); *G01C 21/32* (2013.01); *G08G 1/096741* (2013.01); *G08G 1/096775* (2013.01); *G08G 1/0968* (2013.01)

(58) Field of Classification Search
CPC ............. G01C 21/32; G08G 1/096716; G08G 1/096741; G08G 1/096775; G08G 1/0968
USPC .................. 340/995.14; 701/2, 200, 208, 211
See application file for complete search history.

(56) References Cited

U.S. PATENT DOCUMENTS 6,047,280 A * 4/2000 Ashby et al. ...................... 707/2
6,230,098 B1 * 5/2001 Ando et al. .................. 701/208
(Continued)

FOREIGN PATENT DOCUMENTS

EP 1 371 949 A1 12/2003
EP 1 464 922 A1 10/2004
(Continued)

OTHER PUBLICATIONS

European Search Report of May 16, 2008.

*Primary Examiner* — Khoi Tran
*Assistant Examiner* — Dale Moyer
(74) *Attorney, Agent, or Firm* — Kratz, Quintos & Hanson, LLP

(57) ABSTRACT

A terminal unit (400) of a navigation system (100) transmits to a server (300) list request information containing a rectangular code corresponding to a predetermined display rectangular area of a travel route map. The terminal unit (400) acquires from the server (300) a server POI list corresponding to the rectangular code of the list request information, and when recognizing that the server POI list contains POI individual information corresponding to terminal base data that is not stored in a terminal base storage area, the terminal unit (400) transmits base data request information about POIID of the POI individual information to the server (300). Upon acquisition of server base data corresponding to the base data request information from the server (300), the terminal unit (400) stores the server base data in the terminal base storage area as terminal base data.

19 Claims, 14 Drawing Sheets

(51) Int. Cl.

| | |
|---|---|
| ***G08G 1/0968*** | (2006.01) |
| ***G08G 1/0967*** | (2006.01) |
| *G01C 21/00* | (2006.01) |
| *G06F 17/00* | (2006.01) |

(56) References Cited

U.S. PATENT DOCUMENTS

| | | | | |
|---|---|---|---|---|
| 7,200,626 | B1 * | 4/2007 | Hoang et al. | 707/204 |
| 7,403,852 | B2 * | 7/2008 | Mikuriya et al. | 701/208 |
| 2004/0044752 | A1 * | 3/2004 | Hamaguchi et al. | 709/220 |
| 2004/0070602 | A1 | 4/2004 | Kobuya et al. | 345/738 |
| 2004/0085227 | A1 * | 5/2004 | Mikuriya et al. | 340/995.14 |
| 2004/0196163 | A1 * | 10/2004 | Takenaga et al. | 340/995.12 |
| 2006/0173613 | A1 * | 8/2006 | Iwahori | 701/208 |

FOREIGN PATENT DOCUMENTS

| | | | | |
|---|---|---|---|---|
| JP | 2004-020220 | | 1/2004 | |
| JP | 2004070598 A | * | 3/2004 | G06F 17/30 |
| JP | 2004-198321 | | 7/2004 | |

* cited by examiner

INFORMATION UPDATING DEVICE, INFORMATION DISTRIBUTING DEVICE, INFORMATION PROCESSING SYSTEM, METHOD THEREOF, PROGRAM THEREOF, AND STORAGE MEDIUM STORING THE PROGRAM

BACKGROUND OF THE INVENTION

1. Field of the Invention

The present invention relates to an information updating device, an information distributing device and an information processing system that perform processing related to update of feature information about a feature, and to a method thereof, a program thereof and a storage medium storing the program.

2. Description of Related Art

There has been conventionally known a navigation system that acquires a map or information about various facilities from a server via a network to update map or information stored in a terminal unit such as an in-vehicle or mobile navigation device and a mobile phone (see, for instance, Reference: JP2004-20220A, pages 15 to 24).

In the navigation system disclosed in the Reference, a communication navigation terminal unit transmits to a communications center device an update request for requesting transmission of map data (e.g., map data including information about various facilities positioned on a road map or a map) with a predetermined period having passed from the latest update request date and time. Then, if the communications center device recognizes that the requested map data has been upgraded at least partially, the map data is transmitted to the communication navigation terminal unit. The communication navigation terminal unit then updates the map data.

In an arrangement of the Reference described above, even in a case where, for instance, only one of all feature information respectively about a plurality of features positioned on the map in the map data has been upgraded, the entire map data including feature information that has not been upgraded might be transmitted and received. Thus, the arrangement includes a problem, where the feature information that has not been upgraded and thus does not require to be updated is also transmitted and received, so that amount of various information to be transmitted and received becomes large.

SUMMARY OF THE INVENTION

An object of the present invention is to provide an information updating device, an information distributing device and an information processing system that can properly update feature information about a feature, and to provide a method thereof, a program thereof and a storage medium storing the program.

An information updating device, according to a first aspect of the present invention, acquires feature information about a feature via a network to store the feature information in an update information storage section. The feature information includes feature guidance information about a guidance of the feature and unique information that associates the feature guidance information with the feature. The information updating device includes: a unique information acquirer for, upon recognition of acquisition request information for acquiring feature information of a feature located in a predetermined area, acquiring unique information of the feature information via the network; a selecting section for comparing the unique information acquired by the unique information acquirer and the unique information in the update information storage section to select unique information that is not stored in the update information storage section from the acquired unique information; and an information updating section for acquiring feature information having the unique information selected by the selecting section via the network to store the feature information in the update information storage section.

An information distributing device according to a second aspect of the present invention distributes feature information about a feature stored in distribution information storage section via a network. The feature information includes feature guidance information about a guidance of the feature and unique information that associates the feature guidance information with the feature. The information distributing device includes: a unique information distributor for, upon recognition of distribution request information for requesting distribution of feature information of a feature located in a predetermined area, distributing unique information of the feature information via the network; and a feature information distributor for, upon acquisition of selected unique information selected from the unique information distributed by the unique information distributor via the network, acquiring feature information containing the selected unique information from the distribution information storage section to distribute the acquired feature information via the network.

An information processing system according to a third aspect of the present invention includes: the above-described information updating device of the present invention; and the above-described information distributing device of the present invention which is connected to the information updating device via the network so as to transmit/receive various information. The unique information acquirer of the information updating device outputs, upon recognition of the acquisition request information, the distribution request information via the network. The selecting section of the information updating device outputs the selected unique information via the network.

An information processing system according to a fourth aspect of the present invention includes: the above-described information updating device of the present invention; and the above-described information distributing device of the invention which is connected to the information updating device via the network so as to transmit/receive various information. The unique information acquirer of the information updating device outputs, upon recognition of the acquisition request information, the distribution request information via the network. The selecting section of the information updating device outputs the selected unique information via the network. The unique information distributor of the information distributing device distributes the expiration-time information corresponding to the unique information via the network.

An information processing system according to a fifth aspect of the present invention receives feature information about a feature stored in a distribution information storage section of a server with a terminal unit that is connected to the server via a network so as to transmit/receive various information, the received feature information being stored in an update information storage section. The feature information includes feature guidance information about a guidance of the feature and unique information for associating the feature guidance information with the feature. The server includes: a unique information distributor for, upon recognition of distribution request information from the terminal unit for requesting distribution of feature information of a feature located in a predetermined area, distributing unique information of the feature information to the terminal unit; and a feature information distributor for, when acquiring, from the terminal unit, unique information selected by the terminal unit from the unique information distributed by the unique information distributor, acquiring feature information containing the selected unique information from the distribution information storage section to distribute the acquired feature information to the terminal unit. The terminal unit includes: a unique information acquirer for, upon recognition of acquisition request information for acquiring the feature information of the feature located in the predetermined area, outputting the distribution request information to the server to acquire the unique information of the feature information from the server; a selecting section for comparing the unique information acquired by the unique information acquirer and unique information in the update information storage section to select unique information that is not stored in the update information storage section from the acquired unique information, and outputting the selected unique information to the server; and an information updating section for acquiring feature information having the unique information selected by the selecting section from the server to store the acquired feature information in the update information storage section.

An information update method according to a sixth aspect of the present invention allows a computer to acquire feature information about a feature via a network and to store the feature information in an update information storage section. The feature information includes feature guidance information about a guidance of the feature and unique information that associates the feature guidance information with the feature. The computer-executing method includes: acquiring, upon recognition of acquisition request information for acquiring feature information of a feature located in a predetermined area, unique information of the feature information via the network; comparing the acquired unique information and unique information in the update information storage section to select unique information that is not stored in the update information storage section from the acquired unique information; and acquiring feature information having the selected unique information via the network to store the acquired feature information in the update information storage section.

An information distribution method according to a seventh aspect of the present invention allows a computer to distribute feature information about a feature stored in a distribution information storage section via a network. The feature information includes feature guidance information about a guidance of the feature and unique information that associates the feature guidance information with the feature. The computer-executing method includes: distributing, upon recognition of distribution request information for requesting distribution of feature information of a feature located in a predetermined area, unique information of the feature information via the network; acquiring, upon acquisition of selected unique information selected from the distributed unique information via the network, feature information containing the selected unique information from the distribution information storage section to distribute the acquired feature information via the network.

An information processing method according to an eighth aspect of the present invention allows a computer to receive feature information about a feature stored in a distribution information storage section of a server with a terminal unit that is connected to the server via a network so as to transmit/receive various information, the received feature information being stored in an update information storage section. The computer-executing method includes server processes and terminal unit processes. The feature information includes feature guidance information about a guidance of the feature and unique information for associating the feature guidance information with the feature, the server processes includes: recognizing distribution request information from the terminal unit for requesting distribution of feature information of a feature located in a predetermined area to distribute the unique information of the feature information to the terminal unit; and acquiring, from the terminal unit, unique information selected by the terminal unit from the distributed unique information and acquiring feature information containing the selected unique information from the distribution information storage section to distribute the acquired feature information to the terminal unit. The terminal unit processes includes: recognizing acquisition request information for acquiring the feature information of the feature located in the predetermined area and outputting the distribution request information to the server to acquire the unique information of the feature information from the server; comparing the acquired unique information and unique information in the update information storage section to select unique information that is not stored in the update information storage section from the acquired unique information, and outputting the selected unique information to the server; and acquiring feature information containing the selected unique information from the server to store the acquired feature information in the update information storage section.

An information update program according to a ninth aspect of the present invention operates a computer as the above-described information updating device of the present invention.

An information distribution program according to a tenth aspect of the present invention operates a computer as the above-described information distributing device of the present invention.

An information processing program according to an eleventh aspect of the present invention operates a computer as the above-described information processing system of the present invention.

An information update program according to a twelfth aspect of the present invention operates a computer to perform the above-described information update method of the present invention.

An information distribution program according to a thirteenth aspect of the present invention operates a computer to perform the above-described information distribution method of the present invention.

An information processing program according to a fourteenth aspect of the present invention operates a computer to perform the above-described information processing method of the present invention.

A storage medium according to a fifteenth aspect of the present invention stores the above-described information update program according of the present invention in a manner readable by a computer.

A storage medium according to a sixteenth aspect of the present invention stores the above-described information distribution program of the present invention in a manner readable by a computer.

A storage medium according to a seventeenth aspect of the present invention stores the above-described information processing program of the present invention in a manner readable by a computer.

DETAILED DESCRIPTION OF PREFERRED EMBODIMENT(S)

Figure 1:
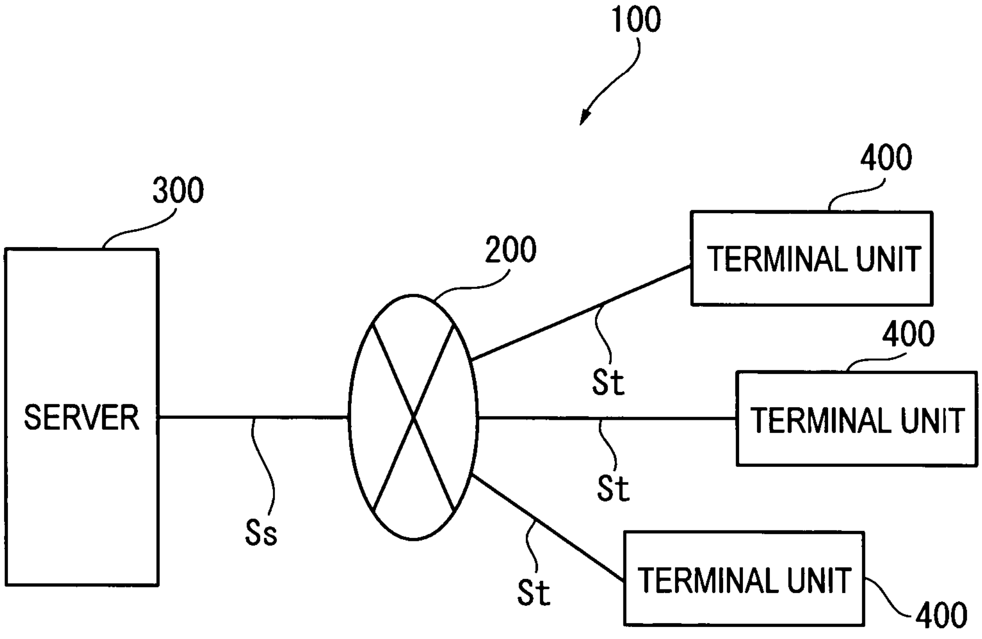
FIG. 1 is a block diagram briefly showing the arrangement of a navigation system according to an embodiment of the present invention.
Figure 2:
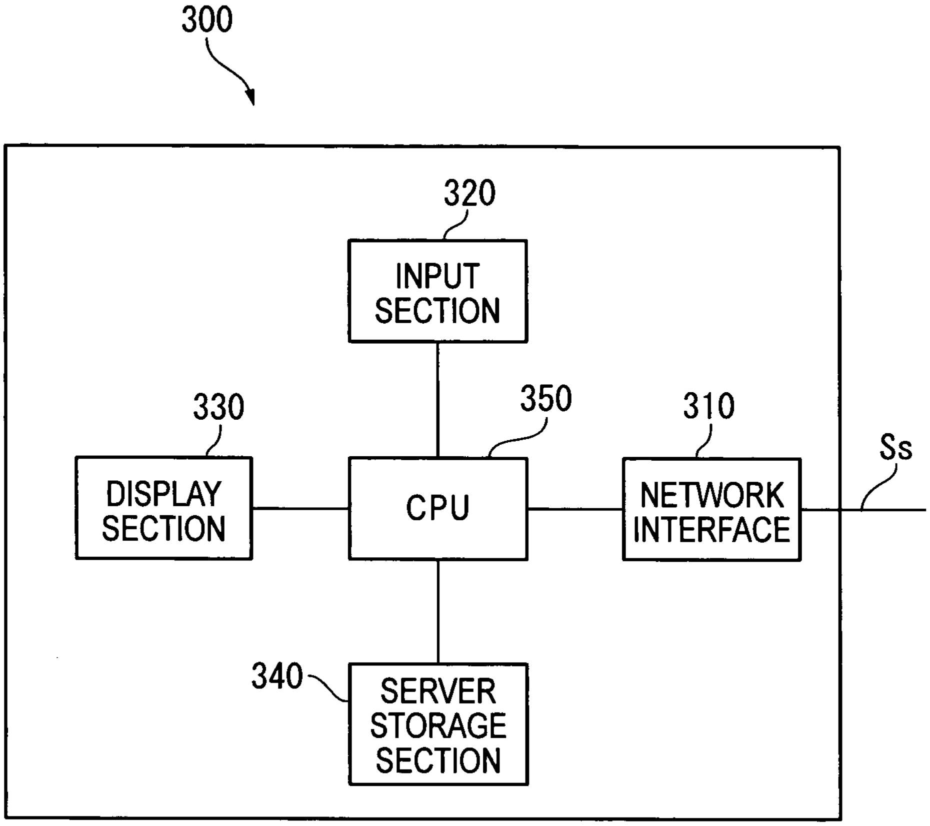
FIG. 2 is a block diagram briefly showing the arrangement of a server of the embodiment.
Figure 3:
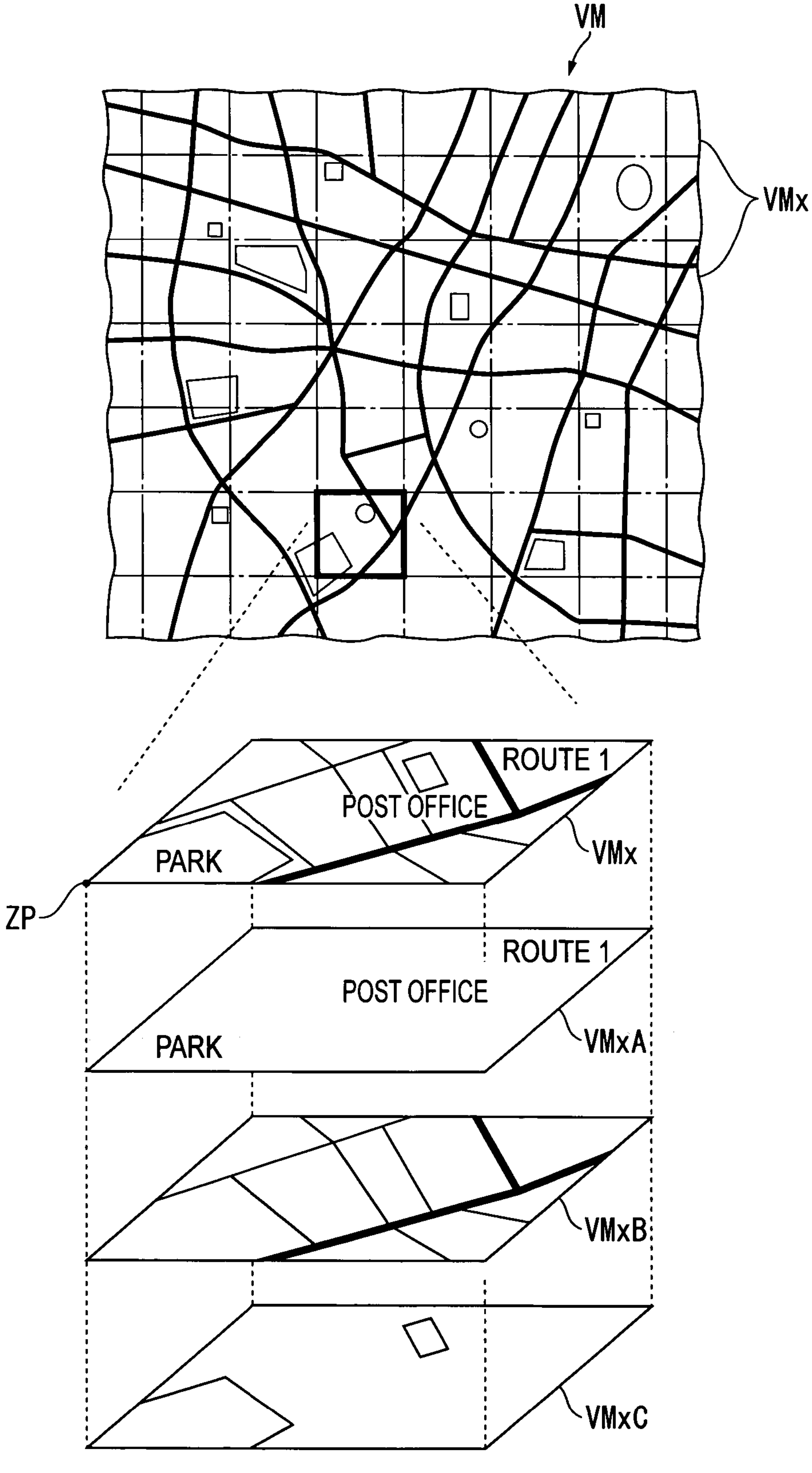
FIG. 3 is a conceptual diagram schematically showing a table structure of display data of map information of the embodiment.
Figure 4:
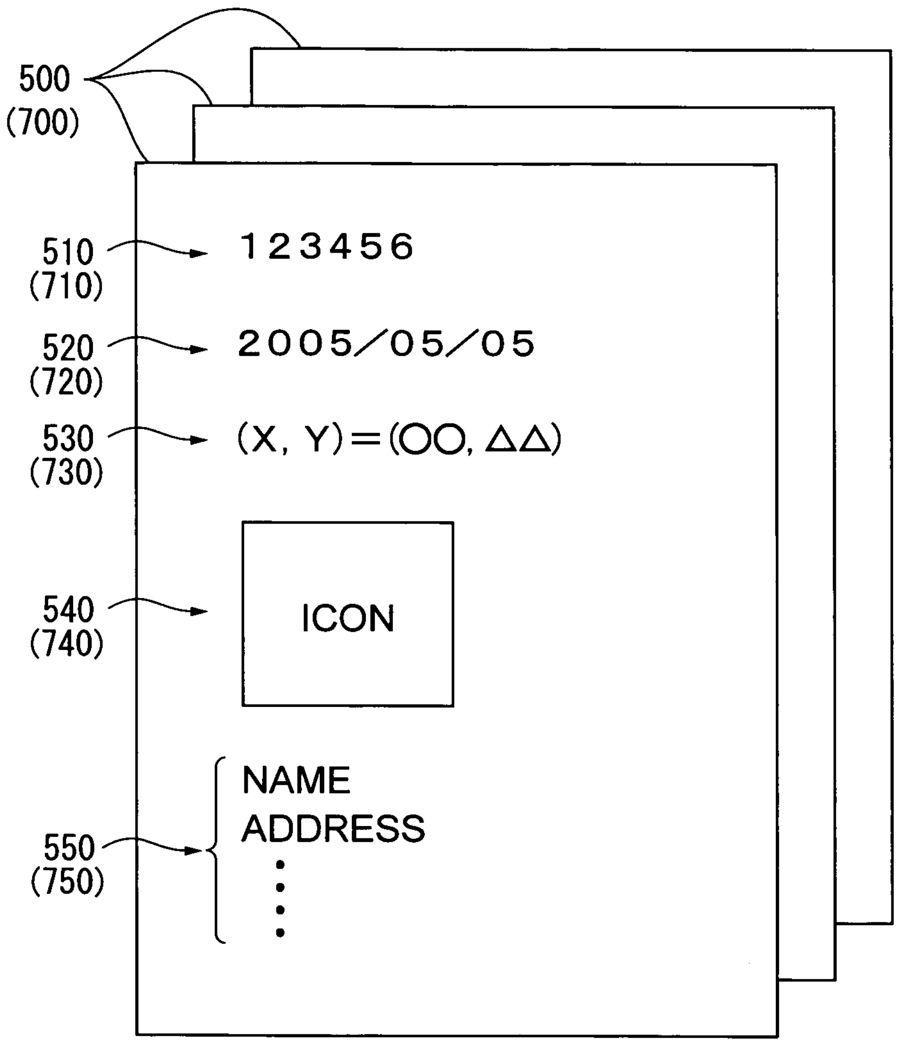
FIG. 4 is a conceptual diagram schematically showing table structures of server POI base data information and terminal POI base data information of the map information of the embodiment.
Figure 5:
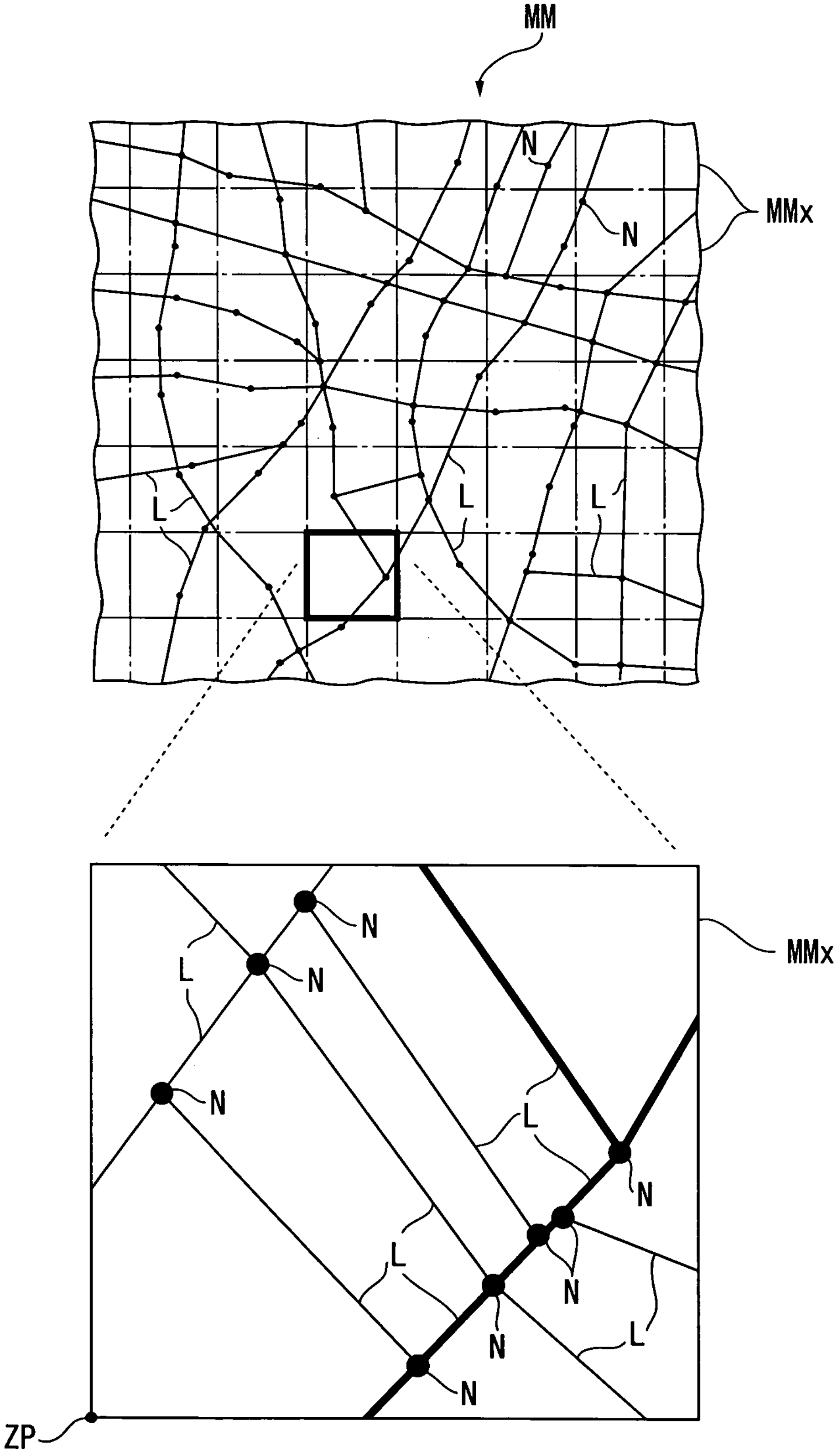
FIG. 5 is a conceptual diagram schematically showing a table structure of matching data of the map information of the embodiment.
Figure 6:
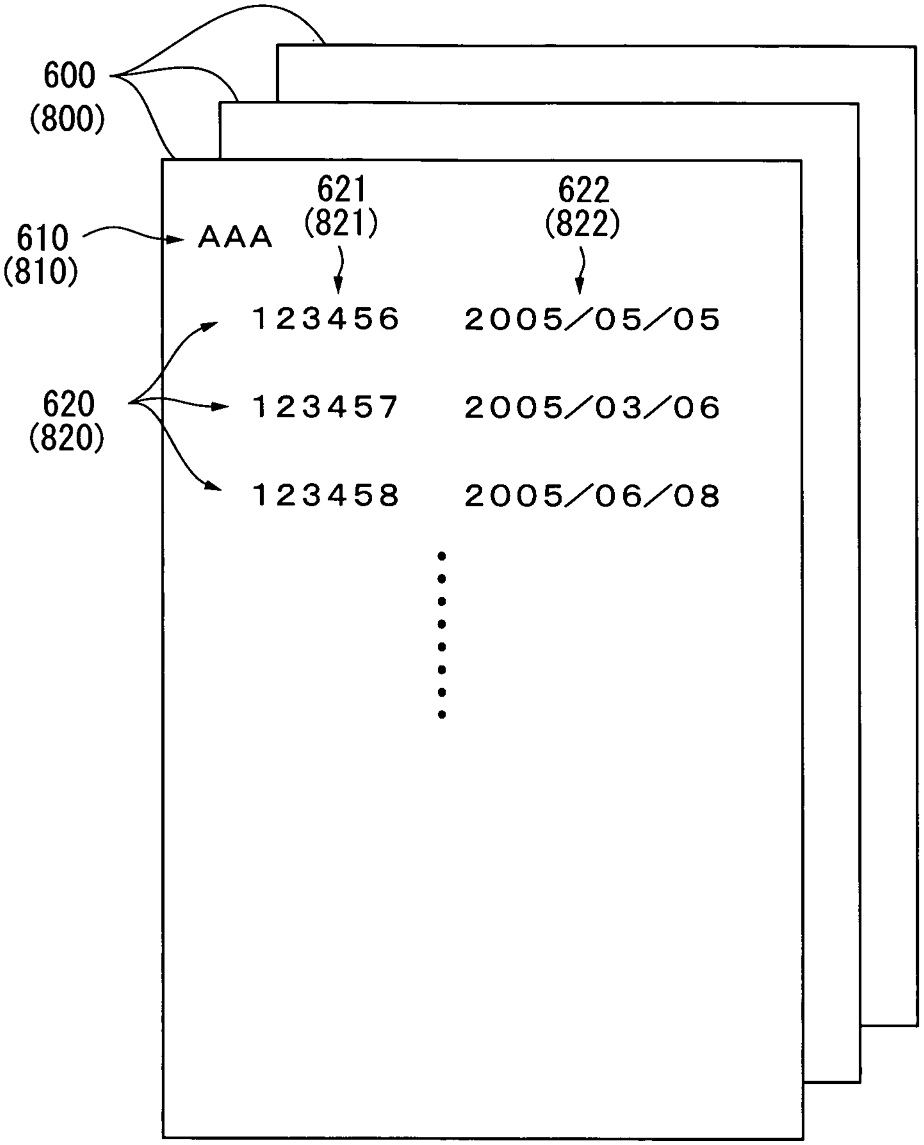
FIG. 6 is a conceptual diagram schematically showing table structures of server POI list information and terminal POI list information of the embodiment.
Figure 7:
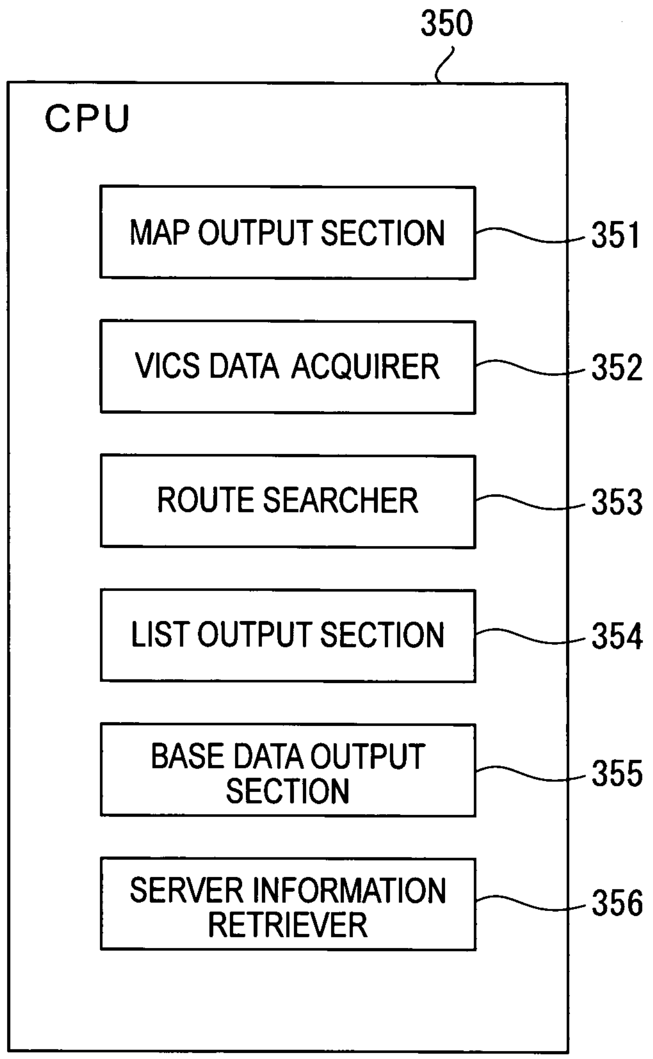
FIG. 7 is a block diagram briefly showing the arrangement of a CPU of the server of the embodiment.
Figure 8:
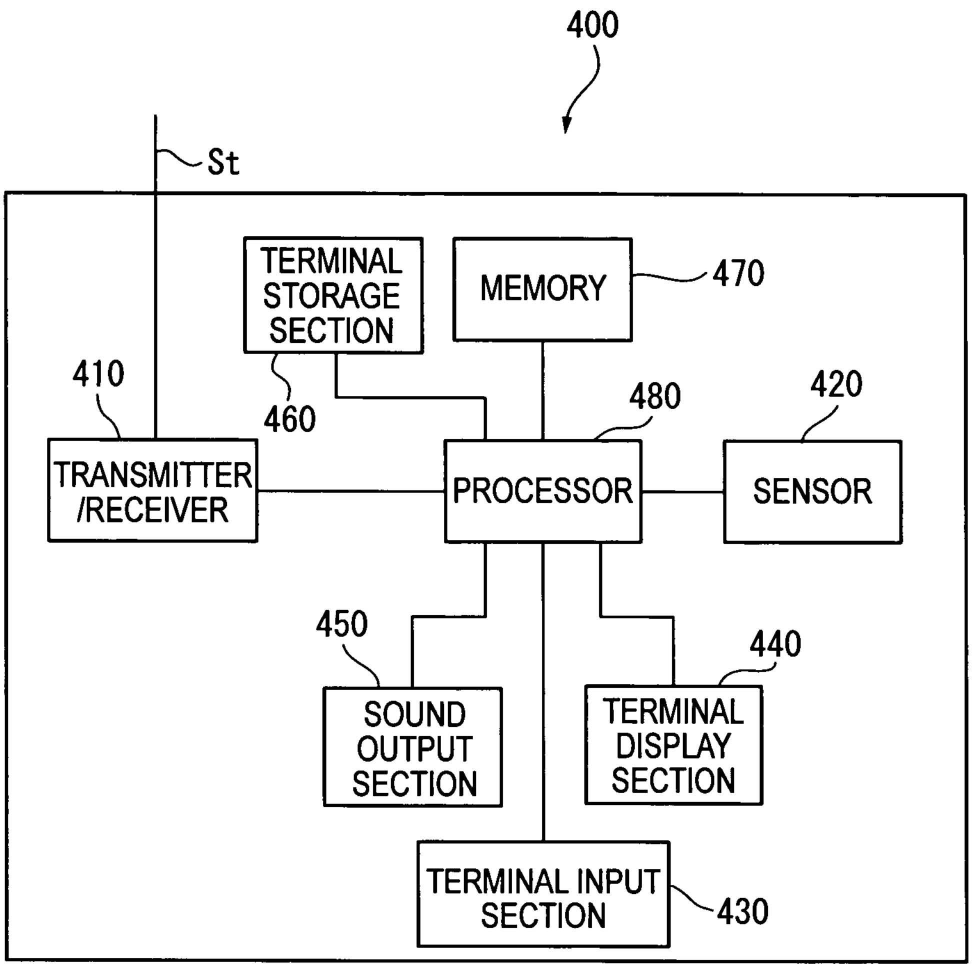
FIG. 8 is a block diagram briefly showing the arrangement of a terminal unit of the embodiment.
Figure 9:
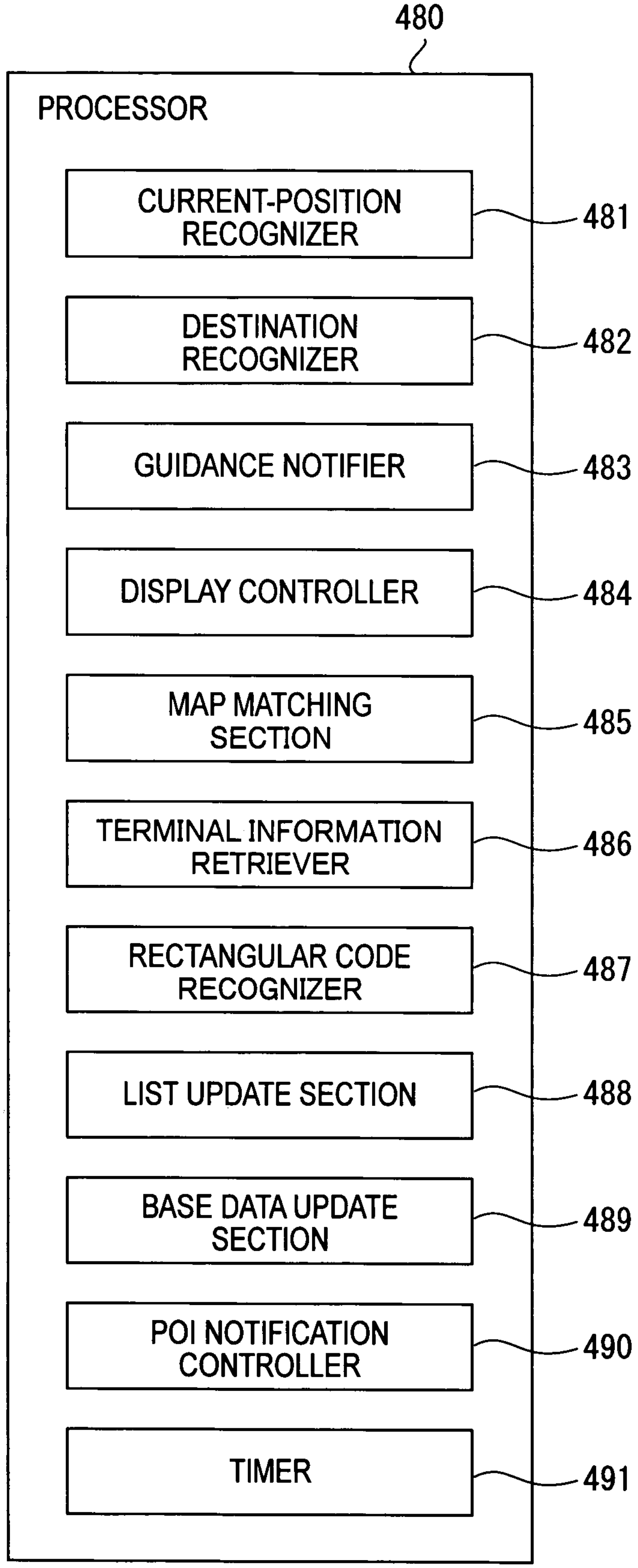
FIG. 9 is a block diagram briefly showing the arrangement of a processor of the terminal unit of the embodiment.
Figure 10:
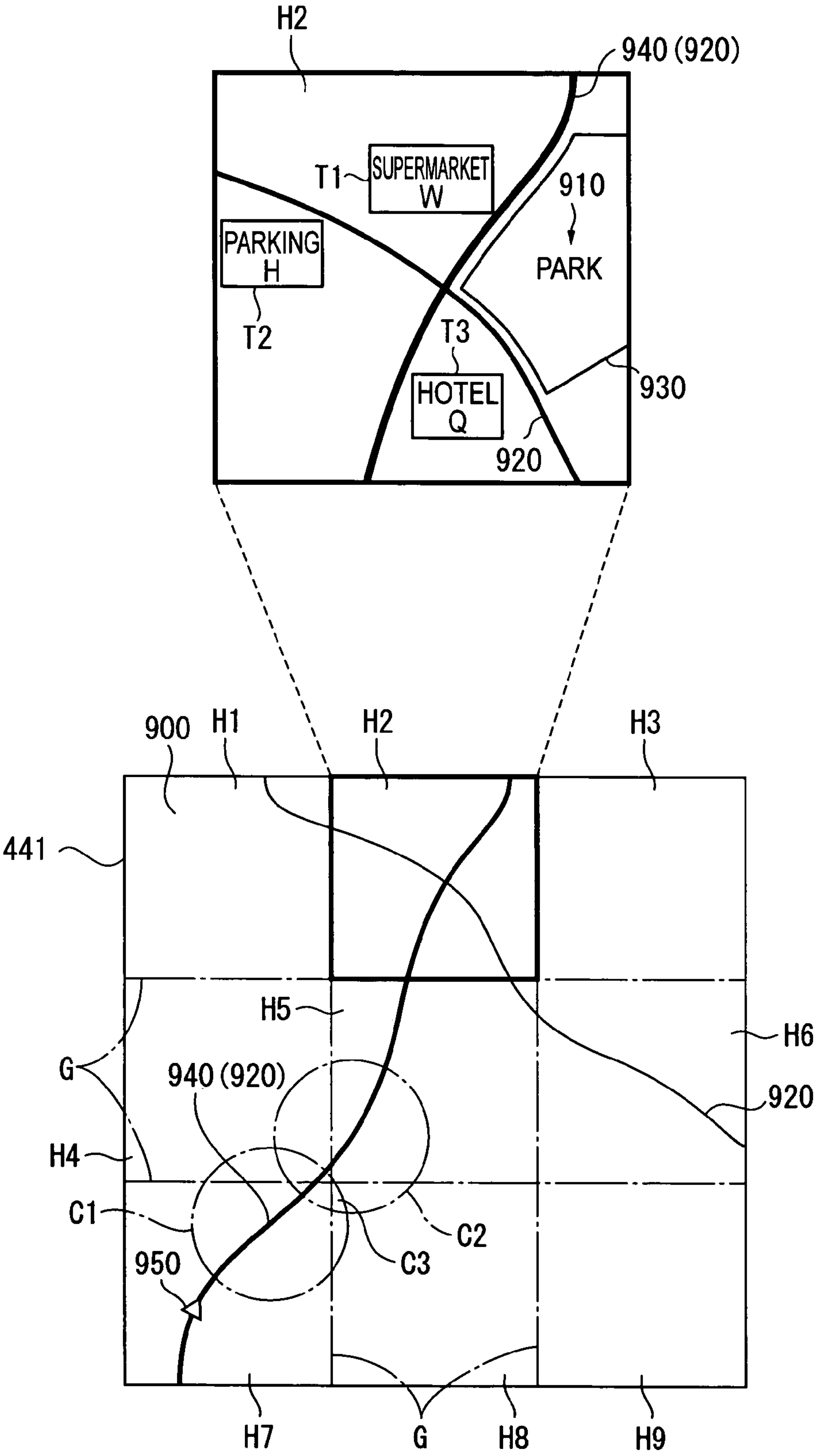
FIG. 10 is a schematic diagram showing an example of a display window of a travel route map that does not include an expired POI icon according to the embodiment.
Figure 11:
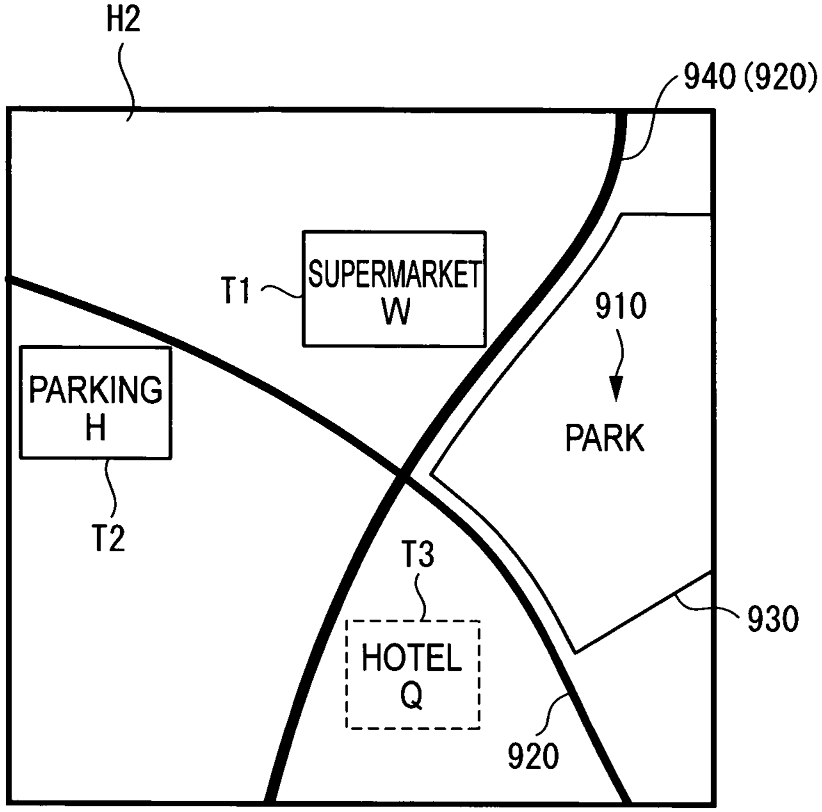
FIG. 11 is a schematic diagram showing an example of a display window of a display rectangular area including an expired POI icon according to the embodiment.

An embodiment of the present invention will be described below with reference to the attached drawings. In the present embodiment, a navigation system having an arrangement for guiding a travel of a mobile body (e.g. a vehicle) will be exemplified as an information processing system of the present invention. Incidentally, the information processing system of the present invention is not limited to the arrangement for guiding travel of the vehicle, but includes arrangements for notifying a traffic condition of any mobile body. FIG. 1 is a block diagram briefly showing the arrangement of the navigation system of the present embodiment. FIG. 2 is a block diagram briefly showing the arrangement of a server. FIG. 3 is a conceptual diagram schematically showing a table structure of display data of map information. FIG. 4 is a conceptual diagram schematically showing table structures of server POI base data information and terminal POI base data information of the map information. FIG. 5 is a conceptual diagram schematically showing a table structure of matching data of the map information. FIG. 6 is a conceptual diagram schematically showing table structures of server POI list information and terminal POI list information. FIG. 7 is a block diagram briefly showing the arrangement of a CPU of the server. FIG. 8 is a block diagram briefly showing the arrangement of a terminal unit. FIG. 9 is a block diagram briefly showing the arrangement of a processor of the terminal unit. FIG. 10 is a schematic diagram showing an example of a display window of a travel route map that does not include an expired POI icon. FIG. 11 is a schematic diagram showing an example of a display window of a display rectangular area that includes an expired POI icon.

[Arrangement of Navigation System]

Referring to FIG. 1, the reference numeral 100 denotes the navigation system. The navigation system 100 notifies guidance in accordance with travel progress of a mobile body such as a vehicle, an aircraft, and a boat and a ship. The navigation system 100 includes a network 200, a server 300 and a terminal unit 400.

The network 200 is connected to the server 300 and the terminal unit 400. The network 200 connects the server 300 and the terminal unit 400 so as to allow transmission/reception of information therebetween. The network 200 may be the Internet based on a general-purpose protocol such as TCP/IP protocol, an intranet, a LAN (Local Area Network), a communication network and a broadcasting network that have a plurality of base stations capable of transmitting/receiving information by way of a radio medium, or the radio medium itself that enables direct transmission/reception of information between the server 300 and the terminal unit 400. The radio medium may be any one of electric waves, light beams, acoustic waves and electromagnetic waves.

The server 300 can transmit/receive information to/from the terminal unit 400 via the network 200. The server 300 is capable of acquiring various information from other servers (not shown) of various government offices such as Meteorological Agency and National Police Agency, private organizations, VICS (Vehicle Information Communication System) and business enterprises via the network 200. The information to be acquired may be travel information for the vehicle, i.e., various travel related information used during the travel of the vehicle such as weather information, traffic information (hereinafter, referred to as VICS data) including congestions, traffic accidents, constructions, traffic controls, and shop information about various shops including gasoline stations and restaurants etc. As shown in FIG. 2, the server 300 includes a network interface 310, an input section 320, a display section 330, a server storage section 340 as a distribution information storage section, a CPU (Central Processing Unit) 350 as a computer and the like.

The network interface 310 is connected to the terminal unit 400 via the network 200 and also connected to the CPU 350. The network interface 310 performs a preset input network interface processing over a server signal Ss that is input via the network 200 to output the server signal Ss as a processing server signal to the CPU 350. When the processing server signal to be transmitted to the terminal unit 400 is input in the network interface 310 from the CPU 350, the network interface 310 performs preset output network interface processing over the input processing server signal to output the processing server signal as a server signal Ss to the terminal unit 400 via the network 200. Note that the server signal Ss can be appropriately output only to a predetermined terminal unit 400 based on information described in the processing server signal.

The input section 320, which may be a keyboard, a mouse or the like, has various operation buttons and operation knobs (each not shown) to be used for input operations. The operation buttons and the operation knobs are used: to input the settings for operations of the server 300; to set information to be stored in the server storage section 340; and to update the information stored in the server storage section 340. When the settings are input, the input section 320 outputs a signal corresponding to the settings to the CPU 350 so as to apply the settings. In place of the input operation using the operation buttons and the operation knobs, input operation using a touch panel arranged on the display section 330, sound input operation and the like may be employed for inputting various settings.

The display section 330, under the control of the CPU 350, displays a signal representing an image data sent from the CPU 350. The display section 330 may typically be a liquid-crystal panel, an organic EL (Electro Luminescence) panel, a PDP (Plasma Display Panel), a CRT (Cathode-Ray Tube), a FED (Field Emission Display), or an electrophoretic display panel. The image data to be displayed on the display section 330 may be those acquired from the server storage section 340 and those acquired from external servers via the network 200.

The server storage section 340 includes a server map storage area (not shown) for readably storing various information received from the terminal unit 400 or the external servers, e.g., map information shown in FIGS. 3 to 5, and a server list storage area (not shown) for readably storing at least one of server POI (Point Of Interest) list information (hereinafter, referred to as server POI list) 600 as shown in FIG. 6. The server storage section 340 may be drives or drivers for readably storing data on storage medium such as a HD (Hard Disk), a DVD (Digital Versatile Disc), an optical disc and a memory card. Information to be stored may include, for example, information input by the input operation at the input section 320, and contents of the information stored with the input operation can be appropriately updated. The server storage section 340 also stores information such as various programs that run on an OS (Operating System) controlling the whole operation of the server 300 and the navigation system 100.

The map information includes, for instance, display data VM as shown in FIG. 3, server POI base data information (hereinafter, referred to as server base data) 500 which is at least one of feature information as shown in FIG. 4, matching data MM as shown in FIG. 5 and route-search map data (not shown).

The display data VM includes, for example, a plurality of display mesh information VMx, each having a rectangular code as a unique number or a symbol. Specifically, the display data VM is divided into a plurality of display mesh information VMx, each relating to an area. The display data VM is constituted from the plurality of display mesh information VMx continuously arranged in a matrix form. The display mesh information VMx may be further divided into a plurality of display mesh information VMx to be contained in a lower layer, each relating to a smaller area. Each display mesh information VMx has a rectangular shape with each side thereof having a predetermined length, which is reduced relative to the actual geographic length according to the map scale. A predetermined corner thereof contains absolute coordinates ZP in the whole map information, e.g., a global map.

The display mesh information VMx is, for instance, constituted from name information VMxA such as intersection names, road information VMxB and background information VMxC. The name information VMxA is data structured in a table for arranging and displaying, for instance, intersection name, regional name, etc. contained in an area at a predetermined position with reference to the positional relationship based on the absolute coordinates ZP. The road information VMxB is a data structured in a table for arranging and displaying a road contained in an area at a predetermined position with reference to the positional relationship based on the absolute coordinates ZP. The background information VMxC is a data structured in a table for arranging and displaying a mark and image information representing famous spots and buildings at a predetermined position with reference to the positional relationship based on the absolute coordinates ZP.

The server base data 500 relates to a facility located at a predetermined position on the map displayed by the display mesh information VMx, e.g., a gasoline station, a parking or a convenience store. The server base data 500 includes POIID (identification) information 510 as unique information, expiration-time information 520, position information 530, icon data 540 as feature guidance information and POI related information 550 as feature guidance information. The POIID information 510 relates to ID (hereinafter, referred to as POIID) such as a unique number or a symbol that interrelates a facility corresponding to the server base data 500 with the respective information 530 and 550 and the icon data 540. The expiration-time information 520 shows expiration date and time of the server base data 500. The date and time shown by the expiration-time information 520 may be, for instance, a date and time corresponding to a term when a facility exists at a position shown by the position information 530 or a time and date corresponding to a term when a event is held shown by the POI related information 550. The position information 530 shows a coordinate of a position of the facility on the map of the display mesh information VMx with respect to the absolute coordinates ZP. The icon data 540 displays a unique mark or a designed character representing the facility as a POI icon Tn (n=natural number) (see, for instance, FIG. 10). The POI icon Tn displayed by the icon data 540 allows a user to identify the facility on the map more easily as compared to a mark displayed by the background information VMxC. The POI related information 550 relates to various information about facilities, which include, for instance, a name, an address, a genre, operating hours, a homepage address, a facility profile and holding of event.

Note that when a new facility is built, server base data 500 of the new facility is newly stored by the input operation at the input section 320, by acquiring the server base data 500 from another server and the like. When a facility is closed, server base data 500 of the closed facility is deleted. In addition, when the expiration time of the server base data 500 is changed as in the case where holding period of a event at a facility is extended, the expiration-time information 520 of the server base data 500 having been stored is changed. When the contents other than the expiration time, such as facility relocation and holding of a new event, of the server base data 500 is changed, the server base data 500 having been stored is deleted. Then, new server base data 500 with a new POIID assigned and the respective information 530, 550 and the icon data 540 having been changed is stored.

The matching data MM, just like the display data VM, is divided into a plurality of matching mesh information MMx, each having a rectangular code as a unique number or a symbol and relating to an area. The matching data MM is constituted from the plurality of matching mesh information MMx continuously arranged in a matrix form. The matching mesh information MMx may be further divided into a plurality of matching mesh information MMx to be contained in a lower layer, each relating to a smaller area. Each matching mesh information MMx has a rectangular shape which is reduced relative to the actual geographic length according to the map scale. A predetermined corner thereof contains absolute coordinates ZP in the whole map information. The matching mesh information MMx and the display mesh information VMx may not necessarily represent the same area. That is, they may be divided according to different scales. If the same scale is used, the rectangular code may be used for associating the data. If different scales are used, the absolute coordinates may be used for associating the data.

The matching data MM is used for the map matching processing for correcting the displayed information to locate a mark representing the vehicle on a road, when the travel progress of the vehicle is superposed on the map information. This processing prevents such errors in which the mark representing the vehicle is displayed on a building instead of the road. The matching data MM has a plurality of link string block information.

As shown in FIG. 5, the link string block information is data structured in a table so that a plurality of links L are mutually associated according to a predetermined rule, the link L representing a road as a segment and connecting nodes N representing points. Specifically, the links L each corresponding to a predetermined length of a road are mutually connected to form polygonal lines (i.e. link strings), which represent continuous roads such as Koshu street and Ome street. Each link L has segment-unique information as a unique number assigned to each link L, and node information as a unique number indicating two nodes N connected by the link L. Each link L is associated with a VICS link to match the positional relationship between the VICS data and the displayed map. Each node N represents a joint point such as an intersection, a corner, a fork, a junction or the like of each road. Information about the node N has point-unique information as a unique number assigned to each node N in the link string block information, coordinate information of the position where each node N is located, and flag information describing whether or not the node N represents a branching position (e.g. intersection, fork) where a plurality of links are crossed.

Further, the link string block information of the matching data MM is associated with information about the road structure that describes, for example, the number of lanes, the width of the road, the number of signals, whether it is a main line or not, whether it is a national road or a state road, a road type such as a toll road, a tunnel structure and the like. Based on the information about the road structure, roads can be displayed on a map corresponding to the display data VM.

The server POI list 600 relates to the server base data 500 corresponding to, for instance, the rectangular area of the display mesh information VMx. The server POI list 600 has rectangular code information 610 and at least one of POI individual information 620. The rectangular code information 610 shows a rectangular code assigned to, for instance, the display mesh information VMx. The POI individual information 620 relates to server base data 500 of a facility located in the rectangular area having the rectangular code. The POI individual information 620 has individual POIID information 621 as unique information with a POIID the same as the POIID information 510 of the server base data 500 described therein and individual expiration-time information 622 as expiration-time information with an expiration time the same as the expiration-time information 520 described therein.

Incidentally, when new server base data 500 is stored in the server map storage area, POI individual information 620 corresponding to the new server base data 500 is added to the server POI list 600. When server base data 500 is deleted from the server map storage area, the corresponding POI individual information 620 is deleted from the server POI list 600 based on the input operation at the input section 320 or under the control of the CPU 350. The individual expiration-time information 622 is updated in accordance with an update of the contents of the corresponding expiration-time information 520.

The route-search map information is structured in a table, which is similar to that of the matching data MM, including the point information for representing points such as the nodes N for representing roads, and the segment information for connecting points such as the links L. The information is so structured as to represent roads for searching for each candidate route.

The server storage section 340 stores personal information about a user who uses the navigation system 100 with the terminal unit 400. The personal information may include a name and an address, a user ID number and a password assigned to each user, a type of the terminal unit 400 for the use of the navigation system 100, and an address number of the terminal unit 400 used for transmitting/receiving information to/from the terminal unit 400. Furthermore, the server storage section 340 stores various information used for performing the navigation processing in a manner readable by the CPU 350.

The CPU 350 includes, as various programs stored in the server storage section 340, a map output section 351, a VICS data acquirer 352, a route searcher 353, a list output section 354 as a unique information distributor, a base data output section 355 as a feature information distributor, a server information retriever 356 and the like. Here, the list output section 354 and the base data output section 355 constitute an information distributing device of the present invention.

The map output section 351 responds to the input processing server signal to refer to the information requesting distribution of the information about the map information contained in the processing server signal, and retrieves and reads out the requested map information from the map information stored in the server storage section 340, e.g., the display data VM and matching data MM corresponding to a predetermined area. The map output section 351 appropriately converts the read map information into a processing server signal, outputs the processing server signal to a predetermined or all terminal units 400 via the network interface 310 and the network 200, and distributes the requested information contained in the map information.

The VICS data acquirer 352 responds to the input processing server signal and refers to information about a search request for a route contained in the processing server signal to acquire VICS data such as congestions, traffic accidents, constructions and traffic controls from the VICS (not shown).

The route searcher 353 responses to the input processing server signal and refers to the information about the search request for the route contained in the processing server signal to compute and search for a travel route using the map information stored in the server storage section 340. Specifically, the route searcher 353 acquires current-position information, destination information, setting information for route setting (each described later) from the terminal unit 400, while acquiring the VICS data from the VICS data acquirer 352. Further, based on the acquired various information and the VICS data, a road on which the vehicle can travel is searched using the route-search map information and the matching data MM on the map information. Then, travel route information including a route with shorter travel time, a route without congestions and traffic controls, etc is generated. The travel route information typically includes route guidance information for navigating the vehicle during the drive thereof for assisting the drive. The route guidance information is appropriately displayed or output with sound at the terminal unit 400 to assist the drive. The route searcher 353 appropriately converts the generated travel route information into a processing server signal and outputs the processing server signal to a predetermined or all terminal units 400 via the network interface 310 and the network 200 to notify the travel route.

The list output section 354 responses to the input processing server signal and refers to list request information as distribution request information for requesting distribution of a predetermined server POI list 600 contained in the processing server signal to retrieve and read out the server POI list 600 from the server list storage area. Specifically, upon acquisition of the list request information from the terminal unit 400, the list output section 354 recognizes a rectangular code contained in the list request information. The list output section 354 then retrieves the rectangular code information 610 containing the rectangular code to read out the server POI list 600 having the retrieved rectangular code information 610. Then, the list output section 354 appropriately converts the read server POI list 600 into a processing server signal, outputs the processing server signal to a predetermined terminal unit 400 via the network interface 310 and the network 200, and distributes the server POI list 600.

The base data output section 355 responses to the input processing server signal and refers to base data request information for requesting distribution of predetermined server base data 500 contained in the processing server signal to retrieve and read out the server base data 500 from the server map storage area. Specifically, upon acquisition of the base data request information from the terminal unit 400, the base data output section 355 recognizes a POIID contained in the base data request information. The base data output section 355 then retrieves the POIID information 510 containing the POIID to read out the server base data 500 having the retrieved POIID information 510. Then, the base data output section 355 appropriately converts the read server base data 500 into a processing server signal, outputs the processing server signal to a predetermined terminal unit 400 via the network interface 310 and the network 200, and distributes the server base data 500.

The server information retriever 356 responds to the input processing server signal and refers to information about search request for information about a predetermined facility or the like contained in the processing server signal to retrieve and read out the POI related information 550 of the server base data 500 or a part of the POI related information 550 stored in the server storage section 340. Then, the server information retriever 356 appropriately converts at least a part of the read POI related information 550 or the like into a processing server signal, outputs the processing server signal to a predetermined terminal unit 400 via the network interface 310 and the network 200, and distributes the information about the facility or the like.

The CPU 350 responds to the signal input from the input section 320 by the input operation at the input section 320, and appropriately performs computation based on the contents corresponding to the input operation to appropriately generate a signal. Then the CPU 350 appropriately outputs the generated signal to the display section 330, the network interface 310 and the server storage section 340 and operates them to execute the input contents.

The terminal unit 400 may be, for example, an in-vehicle unit installed in a vehicle as a mobile body, a portable unit, a PDA (Personal Digital Assistant), a mobile phone, a PHS (Personal Handyphone System) or a portable personal computer. The terminal unit 400 acquires the map information, the travel route information, the server POI list 600 and the server base data 500 distributed by the server 300 via the network 200. Based on the map information and the like, the terminal unit 400 retrieves and displays information about a current position, a destination, a route to the destination, predetermined facilities nearby, information about services offered by the facilities and the like. As shown in FIG. 8, the terminal unit 400 includes a transmitter/receiver 410, a sensor 420, a terminal input section 430, a terminal display section 440 (display section as a notifier), a sound output section 450 (notifier), a terminal storage section 460 (update information storage section), a memory 470, a processor 480 (computer) and so on.

The transmitter/receiver 410 is connected to the server 300 via the network 200, while being connected to the processor 480. The transmitter/receiver 410 can receive a terminal signal St from the server 300 via the network 200. Upon acquisition of the terminal signal St, the transmitter/receiver 410 performs a preset input network interface processing to output the terminal signal St as a processing terminal signal to the processor 480. A processing terminal signal can also be input to the transmitter/receiver 410 from the processor 480. Upon acquisition of the input processing terminal signal, the transmitter/receiver 410 performs a preset output network interface processing to transmit the processing terminal signal as the terminal signal St to the server 300 via the network 200.

The sensor 420 senses the travel progress of a mobile body (e.g. a vehicle), or the current position and the driving status, which is output as a predetermined signal to the processor 480. The sensor 420 typically has a GPS (Global Positioning System) receiver, a speed sensor, an azimuth sensor and an acceleration sensor (each not shown). The GPS receiver receives electric navigation waves output from a GPS satellite (not shown), which is an artificial satellite, via a GPS antenna (not shown). Then, the GPS receiver computes simulated coordinate values of the current position on the basis of a signal corresponding to the received electric navigation waves and outputs the simulated coordinate values as GPS data to the processor 480. The speed sensor senses a travel speed of the vehicle based on a signal varying in accordance with the traveling speed of the vehicle and outputs the travel speed as speed data to the processor 480. The azimuth sensor has a so-called gyro sensor (not shown) and senses an azimuth of the vehicle, i.e., a traveling direction in which the vehicle travels, to output the azimuth as azimuth data to the processor 480. The acceleration sensor senses acceleration in the traveling direction of the vehicle and outputs the acceleration as acceleration data to the processor 480.

The terminal input section 430, which may be a keyboard, a mouse or the like, has various operation buttons and operation knobs (each not shown) to be used for input operations. The operation buttons and the operation knobs are used to input, for example, the settings for the operations of the terminal unit 400. More specifically, the operation buttons and the operation knobs may be used: to set the type of information to be acquired and acquiring criteria; to set a destination; to set setting information about a route to be searched for; to retrieve information; and to display the driving status (travel progress) of the vehicle. When the settings are input, the terminal input section 430 outputs a predetermined signal to the processor 480 so as to apply the settings.

In place of the input operation using the operation buttons and the operation knobs, the terminal input section 430 may employ input operation using a touch panel arranged on the terminal display section 440, sound input operation and the like for inputting various settings.

The terminal display section 440, under the control of the processor 480, displays a signal representing image data transmitted from the processor 480. The image data may be those representing map information, TV image data received by a TV receiver (not shown), those stored in an external device or storage medium such as an optical disc, a magnetic disc or a memory card and read by a drive or a driver, and those in the memory 470. The terminal display section 440 may have an arrangement similar to the display section 330 of the server 300, which may be a liquid-crystal panel, an organic EL panel, a PDP, a CRT, a FED or an electrophoretic display panel.

The sound output section 450 has an audio unit such as a speaker (not shown). The sound output section 450, under the control of the processor 480, outputs various signals as sounds from the audio unit, the various signals representing the sound data etc. from the processor 480. Information output as sounds, which may be the driving direction and the driving status of the vehicle and traffic condition, are notified to occupants such as a driver of the vehicle for navigating the vehicle. The audio unit may output a TV sound data received by a TV receiver (not shown) and a sound data stored in a storage medium or the memory 470. In place of the audio unit provided to the sound output section 450, the sound output section 450 may use an audio unit equipped on the vehicle.

The terminal storage section 460 includes a terminal base storage area (not shown) for readably storing at least one of terminal POI base data information (hereinafter, referred to as terminal base data) 700 as feature information as shown in FIG. 4 and a terminal list storage area (not shown) for readably storing at least one of terminal POI list information (hereinafter, referred to as terminal POI list) 800 as shown in FIG. 6. The terminal server storage section 460 may be drives or drivers for readably storing data on storage medium such as a HD, a DVD, an optical disc and a memory card, which is the arrangement similar to the server storage section 340.

The terminal base data 700 is information similar to the server base data 500, namely information about facilities or the like located at a predetermined position on the map. The terminal base data 700 is appropriately stored in the terminal base storage area, deleted therefrom or updated based on the server POI list 600 acquired from the server 300 by the processor 480. The terminal base data 700 includes POIID information 710 as unique information, expiration-time information 720, position information 730, icon data 740 as feature guidance information and POI related information 750 as feature guidance information. Note that an arrangement in which the terminal base 700 has a data structure that is similar to that of the server base data 500 is exemplified in the above description, but the terminal base data 700 may have other data structures in which, for instance, a plurality of terminal base data 700 are mutually associated as one data structure.

The terminal POI list 800 is information similar to the server POI list 600, namely information about a list of the terminal base data 700 corresponding to a predetermined rectangular area. The terminal POI list 800 is appropriately updated based on the server POI list 600 acquired from the server 300 by the processor 480. The terminal POI list 800 has rectangular code information 810 and at least one of POI individual information 820. The POI individual information 820 has individual POIID information 821 as unique information and individual expiration-time information 822 as expiration-time information. Note that an arrangement in which the terminal POI list 800 has a data structure similar to that of the server POI list 700 is exemplified in the above description, but the terminal POI list 800 may have other data structures in which, for instance, a plurality of terminal POI lists 800 are mutually associated as one data structure.

The memory 470 appropriately stores various information acquired via the network 200, the settings that are input by the terminal input section 430, music data, image data and the like. The memory 470 also stores various programs that run on the OS (Operating System) controlling the whole operation of the terminal unit 400. The memory 470 may include drives or drivers for readably storing data on a storage medium such as a HD, and an optical disc.

The processor 480 has various input/output ports (not shown) including a communication port connected to the transmitter/receiver 410, a GPS receiving port connected to the GPS receiver of the sensor 420, sensor ports respectively connected to various sensors of the sensor 420, a key input port connected to the terminal input section 430, a display control port connected to the terminal display section 440, a sound output port connected to the sound output section 450, a storage port connected to the terminal storage section 460 and a memory port connected to the memory 470. As shown in FIG. 9, the processor 480 includes, as various programs, a current-position recognizer 481, a destination recognizer 482, a guidance notifier 483, a display controller (notification controller) 484 also serving as a map information acquirer, a map matching section 485, a terminal information retriever 486, a rectangular code recognizer 487 also serving as unique information acquirer, a list update section (unique information acquirer and selecting section) 488, a base data update section (information updating section) 489, a POI notification controller (notification controller) 490, a timer 491, and so on. The sections 484, 487, 488, 489 and 490 constitute an information updating device of the present invention. Incidentally, the information updating device of the present invention may not include the display controller 484 and the POI notification controller 490 or may not include the display controller 484.

The current-position recognizer 481 recognizes the current position of the vehicle. Specifically, the current-position recognizer 481 calculates a plurality of current simulated positions of the vehicle based on the speed data and the azimuth data of the vehicle output respectively from the speed sensor and the azimuth sensor of the sensor 420. The current-position recognizer 481 further recognizes the current simulated coordinate values of the vehicle based on the GPS data on the current position output from the GPS receiver. Then, the current-position recognizer 481 compares the calculated current simulated positions with the recognized current simulated coordinate values, and calculates the current position of the vehicle on the map separately acquired to recognize the current position. The current-position recognizer 481 determines a slope angle and an altitude of a road to drive based on the acceleration data output from the acceleration sensor and calculates the current simulated position of the vehicle to recognize the current position. The current-position recognizer 481 can recognize not only the current position of the vehicle as described above but also a starting point, i.e. an initial point set by the terminal input section 430 as the current simulated position. Various information acquired by the current-position recognizer 481 are appropriately stored in the memory 470.

The destination recognizer 482 typically acquires the destination information about the destination set by the input operation at the terminal input section 430 and recognizes the position of the destination. The destination information to be set includes various information for identifying a spot, which might be coordinates such as latitude and longitude, addresses, telephone numbers and the like. The acquired destination information is then appropriately stored in the memory 470.

The guidance notifier 483 provides guidance stored in the memory 470 in visual form by using the terminal display section 440 or in audio form by using the sound output section 450 based on travel route information having been acquired in advance according to the driving status. The guidance is related to the travel of the vehicle, which may be the contents for assisting the drive of the vehicle. Specifically, a predetermined arrow or a symbol may be displayed in a display window of the terminal display section 440, or voice guidance such as "Turn right in 700 meters at intersection XXX toward YYY", "You have deviated from the travel route" or "Congestion ahead" is output from the sound output section 450.

The display controller 484 appropriately controls the terminal display section 440 to display the various information thereon. The display controller 484 also controls display of various display windows for prompting the user to operate the terminal input section 430 so as to set various information.

Further, the display controller 484 appropriately acquires the map information or the travel route information from the sever 300, so that, for instance, a travel route map 900 as shown in FIG. 10 is displayed on a display area 441 of the terminal display section 440. Here, a display rectangular area Hm (m=1 to 9) zoned by imaginary lines G corresponds to at least one rectangular area of the display mesh information VMx, i.e., at least one rectangular code. Incidentally, the number of the display mesh information VMx associated to the display rectangular area Hm may be one, four, nine, etc., depending on a scale of the travel route map 900.

Specifically, the display controller 484 displays a name 910 based on the name information VMxA, a rode 920 based on the road information VMxB, a mark 930 based on the background information VMxC of the map information acquired from the server 300 via the network 200. A set travel route 940 based on the travel route information is displayed on the road 920. Then, a current-position icon 950 is superposed on the road 920 at a position corresponding to the current-position of the vehicle based on the current-position information generated by the current-position recognizer 481. The display controller 484 outputs to the rectangular code recognizer 487 route display information that is map display information as acquisition request information for informing that the travel route map 900 has been displayed. Note that, although an arrangement for displaying the travel route map 900 zoned into the display rectangular areas H1 to H9 is exemplified in the above description, the travel route map 900 to be displayed may be zoned into any number of display rectangular areas Hm, e.g., twelve or sixteen.

The map matching section 485 performs the map matching processing for displaying the current position recognized by the current-position recognizer 481 based on the map information acquired from the server 300. As described above, the map matching section 485 typically uses the matching data MM for performing the map matching processing to appropriately modify or correct the current-position information to prevent, for instance, the current-position icon 950 superposed on the map on the travel route map 900 from being located off the road 920 or the set travel route 940.

When recognizing that a setting for retrieving a facility corresponding to a predetermined region, genre or operating hours is recognized by the terminal input section 430, the terminal information retriever 486 retrieves and acquires POI related information 750 containing contents corresponding to the predetermined area or the like.

The rectangular code recognizer 487 recognizes the rectangular code corresponding to the terminal POI list 800 updated by the list update section 488.

Specifically, when acquiring the travel display information from the display controller 484 and recognizing that the travel route map 900 is displayed, the rectangular code recognizer 487 recognizes a display rectangular area Hm containing the set travel route 940 on the travel route map 900. Further, the rectangular code recognizer 487 recognizes a rectangular code of the display mesh information VMx displaying the display rectangular area Hm to store recognized rectangular code information about the rectangular code in the memory 470. For instance, when the travel rout map 900 as shown in FIG. 10 is displayed, the rectangular code recognizer 487 stores recognized rectangular code information of rectangular codes corresponding to display rectangular areas H2, H4, H5 and H7 in the memory 470. When recognizing that communication with the server 300 is available via the network 200, the rectangular code recognizer 487 generates list request information containing the rectangular code of the recognized rectangular code information. Then, the rectangular code recognizer 487 appropriately converts the list request information into a processing terminal signal to output the signal to the server 300 via the transmitter/receiver 410 and the network 200.

Note that the rectangular code recognizer 487 may recognize all display rectangular areas Hm on the travel route map 900 or only a display rectangular area Hm containing the current position. The rectangular code recognizer 487 recognizes the display rectangular area Hm when recognizing that the travel route map 900 has been displayed in the above description, but may alternatively recognize a rectangular area when recognizing other conditions or states. Specifically, when the terminal unit 400 is turned on, the rectangular code recognizer 487 may acquire travel route information about a travel route estimated based on a travel history corresponding to date and time at that time to recognize a rectangular area corresponding to the estimated travel route. As another alternative example, when recognizing that a terminal POI list 800 containing the predetermined number of or a predetermined ratio of POI individual information 820 that has the individual expiration-time information 822 with dates and times prior to the current date and time in later-described current date/time information acquired from the timer 491, i.e., expired POI individual information 820, the rectangular code recognizer 487 may recognize a rectangular area corresponding to the rectangular code information 810 of the terminal POI list 800. As still another example, upon acquisition of information required in real-time, e.g., congestion information in a predetermined region, the rectangular code recognizer 487 may recognize a rectangular code corresponding to the predetermined region.

The list update section 488 appropriately updates the terminal POI list 800. Specifically, the list update section 488 acquires the recognized rectangular code information from the memory 470. The list update section 488 then retrieves rectangular code information 810 containing the rectangular code of the recognized rectangular code information from the terminal list storage area to acquire the terminal POI list 800 having the retrieved rectangular code information 810.

The list update section 488 also acquires, based on input processing terminal signal, the server POI list 600 distributed as the processing terminal signal. Then, when recognizing that the terminal POI list 800 corresponding to the acquired server POI list 600 contains POI individual information 820 with the contents that does not exist in the server POI list 600, the list update section 488 deletes the POI individual information 820. In other words, when recognizing that there is POI individual information 820 of a facility that used to exist previously but does not exist currently in the rectangular area of the server POI list 600 or POI individual information 820 corresponding to old terminal base data 700 for a facility with which new terminal base data 700 is stored, the list update section 488 deletes such POI individual information 820. The list update section 488 retrieves the individual POIID information 621 containing the POIID of the individual POIID information 821 of each of the POI individual information 820 from the server POI list 600. When recognizing that the individual expiration-time information 622 corresponding to the retrieved individual POIID information 621 does not match with the individual expiration-time information 822 of each of the POI individual information 820, the list update section 488 updates the individual expiration-time information 822 to have the contents of the individual expiration-time information 622. That is, when recognizing than the terminal POI list 800 contains the individual expiration-time information 822 that does not match with the individual expiration-time information 622 of the server POI list 600, the list update section 488 updates the individual expiration-time information 822. Further, when recognizing that the server POI list 600 contains POI individual information 620 having contents that does not exists in the terminal POI list 800, namely POI individual information 620 newly added to the server POI list 600, the list update section 488 adds the new POI individual information 620 to the terminal POI list 800 as POI individual information 820.

The base data update section 489 appropriately deletes the terminal base data 700 stored in the terminal base storage area or stores new terminal base data 700 in the terminal base data storage area. The base data update section 489 also updates time and date of the expiration-time information 720 of the terminal base data 700. Specifically, when recognizing that the POI individual information 820 is deleted from the terminal POI list 800 by the list update section 488, the base data update section 489 retrieves the POIID information 710 containing the POIID of the individual POIID information 821 of the deleted POI individual information 820. The base data update section 489 then deletes the terminal base data 700 of the retrieved POIID information 710 from the terminal base storage area. In other words, the base data update section 489 deletes terminal base data 700 of a facility that used to exist previously but does not exist currently in the rectangular area of the server POI list 600 or old terminal base data 700 for a facility with which new terminal base data 700 is stored.

When recognizing that the individual expiration-time information 822 is updated by the list update section 488, the base data update section 489 retrieves the POIID information 710 containing the POIID of the individual POIID information 821 corresponding to the updated individual expiration-time information 822. The base data update section 489 updates the expiration-time information 720 of the terminal base data 700 containing the retrieved POIID information 710 to the contents of the individual expiration-time information 822.

In addition, when recognizing that the new POI individual information 820 is added to the terminal POI list 800 by the list update section 488, the base data update section 489 generates base data request information containing the POIID of the individual POIID information 821 of the added POI individual information 820. Here, when a plurality of new POI individual information 820 are added, POIID corresponding to each of the POI individual information 820 is contained in the base data request information. Then, the base data update section 489 appropriately converts the base data request information into a processing terminal signal to output the signal to the server 300 via the transmitter/receiver 410 and the network 200. The base data update section 489 also acquires, based on the input processing terminal signal, the server base data 500 distributed as the processing terminal signal. The base data update section 489 then stores the server base data 500 in the terminal base storage area as the terminal base data 700. Incidentally, following arrangement may alternatively be employed. Specifically, even when a plurality of the POI individual information 820 are added, the base data update section 489 may output base data request information containing POIID corresponding to one of the POI individual information 820 to the server 300 while acquiring one of the server base data 500 from the server 300 to store it as the terminal base data 700. Then, the base data update section 489 may output base data request information corresponding to another one of the POI individual information 820.

The POI notification controller 490 performs processing to display a POI icon Tn based on the icon data 740 of the terminal base data 700 on the travel route map 900. Specifically, the POI notification controller 490 acquires the recognized rectangular code information from the memory 470 to recognize a rectangular code of the recognized rectangular code information, namely a display rectangular area Hm on which the POI icon Tn is displayed. The POI notification controller 490 then retrieves the rectangular code information 810 containing the rectangular code from the terminal list storage area to acquire the terminal POI list 800 having the retrieved rectangular code information 810. The POI notification controller 490 retrieves from the terminal base storage area POIID information 710 containing the same POIID as the individual POIID information 821 of each of the POI individual information 820 of the terminal POI list 800 to acquire the terminal base data 700 containing the retrieved POIID information 710. Specifically, the POI notification controller 490 acquires the terminal base data 700 corresponding to the display rectangular area Hm. Then, the POI notification controller 490 displays the POI icon Tn based on the icon data 740 of the terminal base data 700 at a position corresponding to the position information 730 with an expression corresponding to the expiration-time information 720.

When recognizing that the current date and time is before the date and time in the expiration-time information 720 and thus the terminal base data 700 is not expired, the POI notification controller 490 displays the POI icon Tn with an expression such as preset display color and brightness (hereinafter, referred to as unexpired expression). On the other hand, when recognizing that the current date and time is after the date and time in the expiration-time information 720 and thus the terminal base data 700 is expired, the POI notification controller 490 displays the POI icon Tn with an expression, for instance, with a brightness darker than the preset brightness (hereinafter, referred to as expired expression). For instance, when recognizing that the terminal base data 700 of "Supermarket W", "Parking H" and "Hotel Q" located in the display rectangular area H2 on the travel route map 900 are not expired, respective POI icons T1, T2, T3 are displayed with the unexpired expression as shown by solid lines in FIG. 10. On the other hand, when recognizing that only the terminal base data 700 of "Hotel Q" is expired, the POI notification controller 490 displays the POI icon T3 of "Hotel Q" with the expired expression as shown by a broken line in FIG. 11, while displaying the POI icons T1, T2 of "Supermarket W" and "Parking H" with the unexpired expression as shown by the solid lines in FIG. 11.

When recognizing that, for instance, a POI icon Tn is selected at the terminal input section 430, the POI notification controller 490 notifies the POI related information 750 corresponding to the icon data 740 of the selected POI icon Tn, which is, for instance, various information including a name, an address, information about holding of an event, etc. in visual form using the terminal display section 440 or in audio form using the sound output section 450. In addition, the POI notification controller 490 appropriately notifies the POI related information 750 retrieved by the terminal information retriever 486 and a part thereof.

The timer 491 recognizes the current date and time typically based on the reference pulse of an internal clock. The timer appropriately outputs current date/time information of the current date and time.

[Operation of Navigation System]

Figure 12:
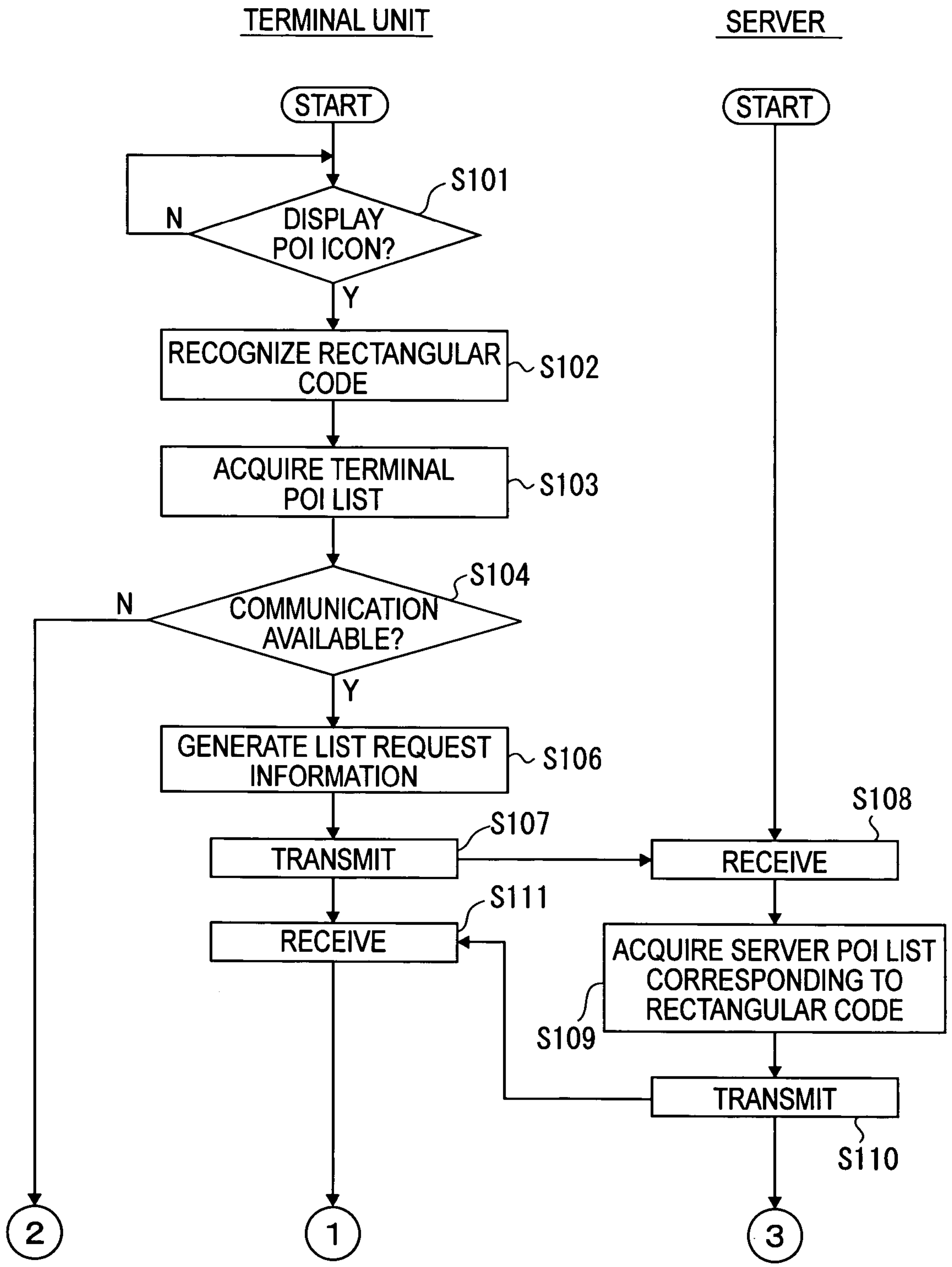
FIG. 12 is a flowchart showing display processing of a POI icon with the latest state being reflected according to the embodiment.
Figure 13:
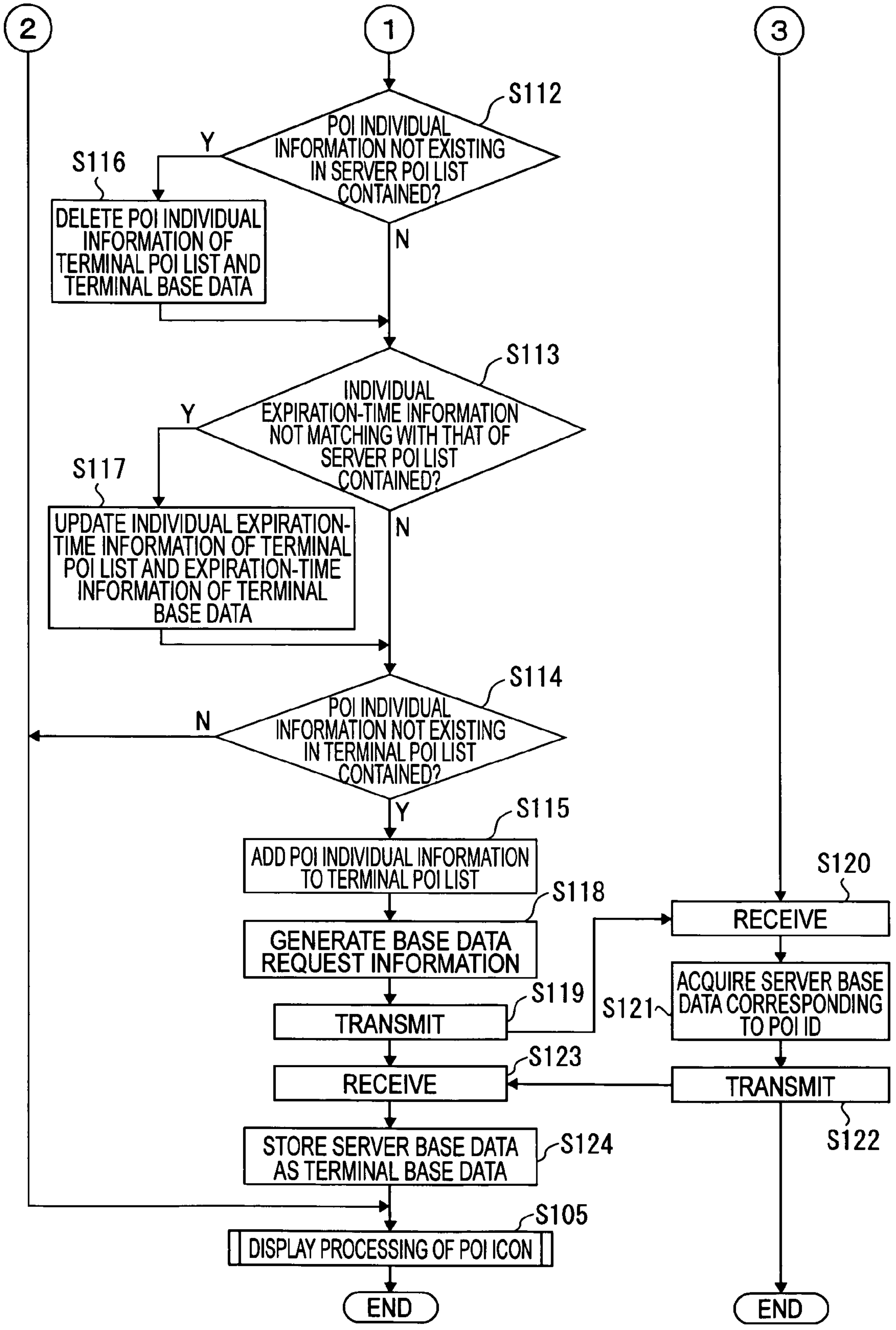
FIG. 13 is another flowchart showing display processing of the POI icon with the latest state being reflected according to the embodiment.
Figure 14:
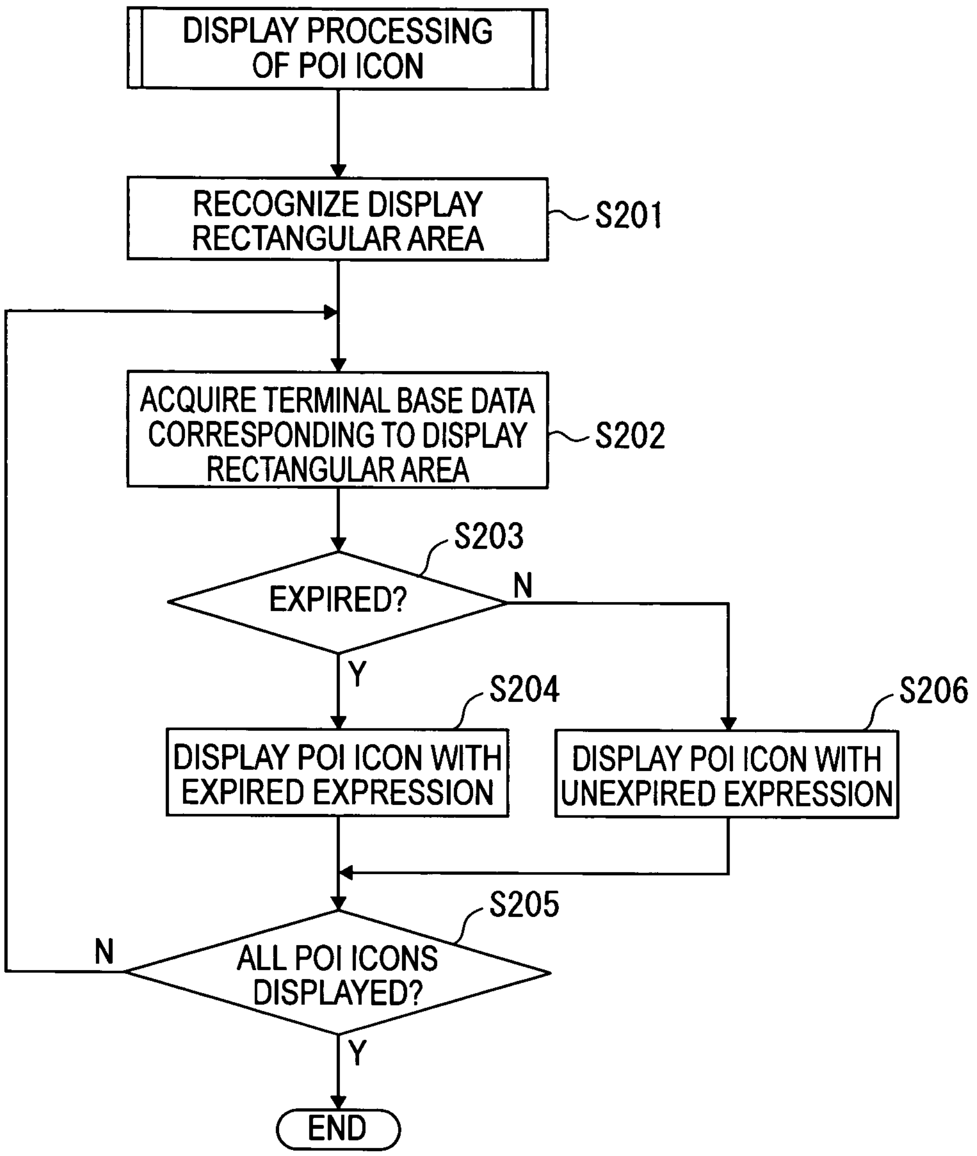
FIG. 14 is a flow chart showing the display processing of the POI icon of the embodiment.

Next, as for operation of the navigation system 100, display processing of the POI icon with the latest state being reflected will be described referring to FIGS. 12 to 14. FIGS. 12 and 13 are flowcharts showing display processing of the POI icon with the latest state being reflected. FIG. 14 is a flowchart showing the display processing of the POI icon.

First, as shown in FIG. 12, when the rectangular code recognizer 487 of the processor 480 recognizes that, for instance, the travel route map 900 as shown in FIG. 10 has been displayed on the terminal display section 440 under the control of the display controller 484, the terminal unit 400 determines to display the POI icon Tn on the travel route map 900 (Step S101). Then, the rectangular code recognizer 487 recognizes the rectangular code corresponding to the display rectangular area Hm containing the set travel route 940 (Step S102). The processor 480 then allows the list update section 488 to acquire the terminal POI list 800 corresponding to the rectangular code (Step S103) and determines if communication with the server 300 is available or not (Step S104). When the communication is determined to be unavailable in Step S104, the POI notification controller 490 performs the display processing of the POI icon as shown in FIG. 13 (Step S105) to terminate the processing. On the other hand, when the communication is determined to be available in Step S104, the rectangular code recognizer 487 generates the list request information about the rectangular code as shown in FIG. 12 (Step S106). Then, the terminal unit 400 allows the transmitter/receiver 410 to transmit the list request information, the terminal unique information identifying the terminal unit 400, etc. to the server 300 via the network 200 (Step S107).

Then, the server 300 receives the list request information, the terminal unique information, etc. at the network interface 310 (Step S108), and allows the list output section 354 of the CPU 350 to acquire the server POI list 600 corresponding to the rectangular code contained in the list request information from the server list storage area (Step S109). Then, the list output section 354 transmits the server POI list 600 to the terminal unit 400 identified by the terminal unique information from the network interface 310 via the network 200 (Step S110).

When the terminal unit 400 receives the server POI list 600 from the server 300 (Step S111), and the list update section 488 determines if the terminal POI list 800 corresponding to the server POI list 600 contains POI individual information 820 having the contents that does not exist in the server POI list 600 as shown in FIG. 13 (Step S112). In Step S112, when it is determined that the terminal POI list 800 has no POI individual information 820 with the contents that does not exist in the server POI list 600, the list update section 488 then determines if there is specific expiration-time information 822 that does not match with the individual expiration-time information 622 of the server POI list 600 (Step S113). In Step S113, when it is determined that there is no individual expiration-time information 822 that does not match with the individual expiration-time information 622, the list update section 488 then determines if the server POI list 600 contains POI individual information 620 with the contents that does not exist in the terminal POI list 800 (Step S114).

In Step S114, when it is determined that there is no POI individual information 620 that doest not exist in the terminal POI list 800, the processing of Step S105 is performed. On the other hand, when it is determined that there is POI individual information 620 that does not exist in the terminal POI list 800 in Step S114, the list update section 488 adds the POI individual information 620 to the terminal POI list 800 as the POI individual information 820 (Step S115). In Step S112, when it is determined that there is the POI individual information 820 that does not exist in the server POI list 600, the POI individual information 820 is deleted from the terminal POI list 800. The processor 480 allows the base data update section 489 to delete the terminal base data 700 corresponding to the deleted POI individual information 820 from the terminal base storage area (Step S116) to terminate the processing of Step S113. When it is determined that there is individual expiration-time information 822 that does not match with the individual expiration-time information 622, the base data update section 489 updates the individual expiration-time information 822 of the terminal POI list 800 to the date and time in the individual expiration-time information 622. The base data update section 489 updates the expiration-time information 720 of the terminal base data 700 corresponding to the updated individual expiration-time information 822 to the date and time in the individual expiration-time information 822 (Step S117) to perform the processing of Step S114.

When recognizing that the new POI individual information 820 is added by the list update section 488, the base data update section 489 generates the base data request information about the POIID of the added POI individual information 820 (Step S118). Then, the transmitter/receiver 410 transmits the base data request information and the like to the server 300 (Step S119).

When the server 300 receives the base data request information from the terminal unit 400 (Step S120), the server 300 allows the base data output section 355 of the CPU 350 to acquire the server base data 500 corresponding to the POIID contained in the base data request information from the server map storage area (Step S121). Then, the base data output section 355 allows the network interface 310 to transmit the server base data 500 to the terminal unit 400 (Step S122).

When the terminal unit 400 receives the server base data 500 from the server 300 (Step S123), the base data update section 489 stores the server base data 500 in the terminal base storage area as the terminal base data 700 (Step S124). The processor 480 then performs the processing of Step S105.

In the display processing of the POI icon, the POI notification controller 490 recognizes the display rectangular area Hm of the travel route map 900 based on the rectangular code recognized by the rectangular code recognizer 487 as shown in FIG. 14 (Step S201). Then, the POI notification controller 490 acquires the terminal base data 700 corresponding to the display rectangular area Hm (Step S202) to determine if the terminal base data 700 is expired or not (Step S203). In Step S203, when the terminal base data 700 (e.g., the terminal base data 700 corresponding to "Hotel Q") is determined to be expired, the POI notification controller 490 displays the POI icon T3 in the expired form as shown by the broken line in FIG. 11 (Step S204). It is then determined if all the POI icons Tn located in the display rectangular area Hm are displayed or not (Step S205).

In Step S205, when all of the POI icons Tn are determined to be displayed, the processing is terminated. On the other hand, in Step S205, when not all of the POI icons Tn are determined to be displayed, the processing returns to Step S202. In Step S203, when the terminal base data 700 (e.g., the terminal base data 700 corresponding to "Hotel Q") is determined not to be expired, the POI notification controller 490 displays the POI icon T3 in the unexpired form as shown by the solid line in FIG. 10 (Step S206), and the processing of Step S205 is performed.

[Advantage of Navigation System]

As described above, when the rectangular code recognizer 487 of the processor 480 recognizes that the travel route map 900 is displayed on the terminal display section 440, the terminal unit 400 of the navigation system 100 recognizes the rectangular code corresponding to the display rectangular area Hm including the set travel route 940. The terminal unit 400 transmits the list request information containing the rectangular code to the server 300. Then, upon acquisition of the server POI list 600 corresponding to the rectangular code of the list request information from the server 300, the list update section 488 determines if the server POI list 600 contains the individual POIID information 621 corresponding to the terminal base data 700 that is not stored in the terminal base storage area. When it is determined that there is individual POIID information 621 corresponding to the terminal base data 700, the processor 480 allows the base data update section 489 to transmit the base data request information containing the POIID of the individual POIID information 621 to the server 300. Then, upon acquisition of the server base data 500 corresponding to the base data request information from the server 300, the base data update section 489 stores the server base data 500 in the terminal base storage area as the terminal base data 700. With the arrangement, the terminal unit 400 does not acquire the server base data 500 stored in the terminal base storage area from the server 300, but only acquires the server base data 500 that is not stored to store it as the terminal base data 700. Thus, the terminal unit 400 can minimize information amount of various information to be acquired, thus reducing communication load and communication cost while increasing communication speed. When the contents other than the expiration time of the server base data 500 is changed due to relocation of a facility or holding of a new event, the terminal unit 400 can acquire new server base data 500 having POIID different from that of the old server base data 500 to store the new one as the terminal base data 700 with the content having been changed. Thus, the terminal unit 400 can store the terminal base data 700 with the contents having been changed with a simple method in which the POIID information 710 and the individual POIID information 621 are compared, which does not require changing processing of the various information 730, 750 and/or the icon data 740. Therefore, the terminal unit 400 can appropriately update the terminal base data 700.

In addition, the terminal unit 400 stores the terminal POI list 800 related to the list of the terminal base data 700 of the terminal base storage area in the terminal list storage area. Then, when the list update section 488, upon acquisition of the server POI list 600, determines that the server POI list 600 contains the POI individual information 620 with the contents that does not exist in the terminal POI list 800, the list update section 488 determines that the POI individual information 620 corresponds to the terminal base data 700 that is not stored in the terminal base storage area. Then, the list update section 488 adds the POI individual information 620 to the terminal POI list 800 as the POI individual information 820. Thus, the terminal unit 400 can identify the terminal base data 700 to be requested for distribution with a simple arrangement in which the respective POI lists 600 and 800 are compared. Therefore, the terminal unit 400 can appropriately update the terminal base data 700.

Then, the base data update section 489 deletes the old terminal base data 700 for the facility with which new terminal base data 700 is stored. Thus, the terminal unit 400 can appropriately store only the latest terminal base data 700 for facilities located in the rectangular area of the server POI list 600 in the terminal base storage area. Therefore, the terminal unit 400 can update the terminal base data 700 more appropriately.

The base data update section 489 further deletes the terminal base data 700 for the facility that used to exist previously but does not exist currently in the rectangular area corresponding to the server POI list 600. Thus, the terminal unit 400 can appropriately store only the latest terminal base data 700 for the facilities currently located in the rectangular area of the serve POI list 600 in the terminal base storage area. Therefore, the terminal unit 400 can update the terminal base data 700 more appropriately.

Further, when recognizing that the terminal POI list 800 contains the POI individual information 820 with the content that does not exists in the server POI list 600, the list update section 488 deletes the POI individual information 820. The base data update section 489 determines that the terminal base data 700 corresponding to the deleted POI individual information 820 is the terminal base data 700 of the facility that is currently located in the rectangular area of the server POI list 600 or the old terminal baser data 700 corresponding to the facility with which the new terminal base data 700 is stored. Thus, the terminal unit 400 can update the terminal base data 700 to be the one with which the current state of the facility is reflected with a simple arrangement for comparing the respective POI lists 600 and 800. Therefore, the terminal unit 400 can update the terminal base data 700 appropriately and easily.

When recognizing the route display information indicating that the travel route map 900 has been displayed, the rectangular code recognizer 487 recognizes the display rectangular area Hm corresponding to the set travel route 940 of the travel route map 900. Then, the base data update section 489 stores the terminal base data 700 of the facility in the display rectangular area Hm. Thus, the terminal unit 400 can only update the terminal base data 700 for facilities near the set travel route 940 on which the user travels. Therefore, the terminal unit 400 can minimize the data amount of the terminal base data 700 to be updated.

Each of the base data 500, 700 has the expiration-time information 520, 720 indicating the expiration time of the base data 500, 700. Each of the POI lists 600, 800 has the individual expiration-time information 622, 822 containing the date and time of the expiration-time information 520, 720. When recognizing that the terminal POI list 800 contains the individual expiration-time information 822 that does not match with the individual expiration-time information 622 of the server POI list 600, the list update section 488 updates the individual expiration-time information 822 to the date and time in the individual expiration-time information 622.

The base data update section 489 updates the expiration-time information 720 of the terminal base data 700 corresponding to the updated individual expiration-time information 822 to the date and time in the individual expiration-time information 822. Thus, when each of the expiration-time information 520, 622 is updated at the server 300 due to, for instance, extension of a predetermined event at a facility, the terminal unit 400 can update the terminal POI list 800 and the terminal base data 700 by reflecting the updated contents. Therefore, the terminal unit 400 can appropriately update the terminal base data 700.

The processor 480 notifies, under the control of the POI notification controller 490, various information about the facilities, namely the POI related information 750 with the terminal display section 440 and the sound output section 450. Thus, the user can recognize, for instance, that a new event will be held at a facility through notification of the contents of the appropriately updated POI related information 750. Therefore, the terminal unit 400 can appropriately notify information about facility and the like.

The processor 480 appropriately acquires the map information and the travel route information from the server 300 to display the travel route map 900 on the terminal display section 440. The POI notification controller 490 displays the POI icon Tn based on the icon data 740 at a position corresponding to the position information 730 on the travel route map 900. Thus, the user can recognize, for instance, a position of a facility having been closed or relocated based on a display of the icon data 740 that is appropriately updated on the travel route map 900. Therefore, the terminal unit 400 can notify information about facility and the like more appropriately.

The POI notification controller 490 displays the POI icon Tn with an expression based on whether the expiration time of the expiration-time information has passed or not. Thus, the user can recognize update condition of the terminal base data 700 related to the POI icon Tn only by recognizing the expression of the POI icon Tn, which is a simple method. When the POI icon Tn is displayed with the expired expression, the user can easily recognize possibility of nonexistence of the facility. Therefore, the terminal unit 400 can notify information about facilities and the like more appropriately.

The POI notification controller 490 displays the unexpired POI icon Tn with the unexpired expression with preset brightness and color, while displaying the expired POI icon Tn with the expired expression with the brightness darker than the preset brightness. Thus, the user can recognize the update condition of the terminal base data 700, the possibility of the nonexistence of the facility and the like based on the brightness of display, which is generally easy to identify. Therefore, the terminal unit 400 can notify information about facility and the like more appropriately.

When the server 300 of the navigation system 100 acquires the list request information containing the rectangular code corresponding to the predetermined display rectangular area Hm from the terminal unit 400, the sever 300 allows the list output section 354 of the CPU 350 to transmit the server POI list 600 corresponding to the rectangular code to the terminal unit 400. Then, upon acquisition of the base data request information about the POIID of the predetermined POI individual information 620 contained in the transmitted server POI list 600, the CPU 350 allows the base data output section 355 to transmit the server base data 500 corresponding to the POIID to the terminal unit 400. Thus, the server 300 can only distributes requested server base data 500 without distributing server base data 500 that has not been requested by the terminal unit 400. Thus, unlike conventional arrangements, the server 300 does not have to distribute the server base data 500 which the terminal unit 400 does not require to update, thus minimizing information amount of the various information to be distributed. When the contents other than the expiration time of the server base data 500 is changed, the server 300 can allow the terminal unit 400 to acquire new server base data 500 having POIID different from that of the old server base data 500 and to perform storage processing of the terminal base data 700 with the content having been changed. Thus, the server 300 can allow the terminal unit 400 to perform the storage processing of the terminal base data 700 with the contents having been changed with a simple method in which the POIID information 710 and the individual POIID information 621 are compared. Therefore, the server 300 can allow the terminal unit 400 to appropriately update the terminal base data 700.

Further, the list output section 354 acquires the server POI list 600 stored in the server list storage area to transmit it to the terminal unit 400. Thus, the server 300 can transmit the server POI list 600 requested by the terminal unit 400 with a simple method in which the requested server POI list 600 is retrieved from the server POI list 600 stored in the server list storage area. Thus, processing load of the server 300 can be reduced in transmission processing of the server POI list 600.

The server 300 appropriately distributes the server base data 500 having the expiration-time information 520 and the server POI list 600 having the individual expiration-time information 622 to the terminal unit 400. Thus, the server 300 can notify, for instance, the terminal unit 400 whether various information about facilities or the like in the server base data 500 is expired with the expiration-time information 520. Therefore, the server 300 can appropriately notify the terminal unit 400 the information about facilities and the like.

The terminal unit 400 transmits the rectangular code corresponding to the rectangular display rectangular area Hm to the server 300. Then, the server 300 distributes to the terminal unit 400 the server POI list 600 having the POI individual information 620 corresponding to the facilities and the like located in the display rectangular area Hm. In other words, the navigation system 100 manages the POI individual information 620 with the server POI list 600 in accordance with the display rectangular area Hm. Thus, unlike an arrangement in which the POI individual information 620 is managed with a circular area Ci (i=natural number) as shown by an imaginative line in FIG. 10, overlapped POI individual information 620 does not have to be added to each of the POI lists 600. Specifically, in the arrangement in which the POI individual information 620 is managed with the circular area Ci, when, for instance, the POI individual information 620 corresponding to facilities in the entire area of the travel route map 900 is added to the server POI list 600, parts of circular areas C1 and C2 have to be overlapped. With the arrangement, the POI individual information 620 corresponding to overlapped area C3 has to be added to each of the server POI lists 600 corresponding to the circular areas C1, C2. On the other hand, in the arrangement in which the POI individual information 620 is managed with the display rectangular area Hm, the display rectangular areas H1 to H9 do not overlap each other. With the arrangement, overlapped POI individual information 620 does not have to be added to each of the POI lists 600 corresponding to the display rectangular areas H1 to H9. Therefore, the navigation system 100 can transmit/receive the POI individual information 620 efficiently as compared to the arrangement in which the POI individual information 620 is managed with the circular area C1.

The navigation system 100 transmits and receives the server POI list 600 having at least one of the POI individual information 620 corresponding to the display rectangular area Hm. Thus, the navigation system 100 can reduce the number of transmission/reception as compared to the arrangement in which, for instance, a plurality of the POI individual information 620 corresponding to the display rectangular area Hm is transmitted/received one by one. Therefore, the navigation system 100 can transmit/receive the POI individual information 620 even more efficiently.

[Modification of Embodiment]

The present invention is not limited to the above specific embodiment, but includes modifications and improvements as long as the objects of the present invention can be attained.

Specifically, the following arrangement may be employed instead of storing the terminal POI list 800 in the terminal unit 400. For instance, the base data update section 489 acquires the server POI list 600 from the server 300 and determines if the server POI list 600 contains the individual POIID information 621 that does not match with the POIID information 710 of the terminal base data 700. When recognizing the existence of the individual POIID information 621 that does not match with the POIID information 710, the base data request information of the individual POIID information 621 may be transmitted. With the arrangement, the terminal list storage area does not have to be provided to the terminal storage section 460, thus simplifying the arrangement of the terminal storage section 460. Further, the list update section 488 does not have to be provided to the processor 480, thus simplifying the arrangement of the processor 480. Still further, since the terminal POI list 800 is not updated, the update processing of the terminal base data 700 can be simplified.

The base data update section 489 may not delete the terminal base data 700 corresponding to the POI individual information 820 having the contents not existing in the server POI list 600, i.e., the terminal base data 700 of a facility that used to exist previously but does not exist currently in the rectangular area corresponding to the server POI list 600 or old terminal base data 700 for a facility with which new terminal base data 700 is stored. With the arrangement, the processor 480, upon reception of the server POI list 600 in Step S111, performs the processing of the Step S113. Thus, the processing of Steps S112 and S116 can be omitted, thus further simplifying the update processing of the terminal base data 700. Since the base data update section 489 may not be provided with a function for deleting the terminal base data 700, thus simplifying the arrangement of the base data update section 489.

When recognizing retrieval performance information for performing retrieval of a facility located in a predetermined region by the terminal information retriever 486, the rectangular code recognizer 487 may recognize a rectangular area corresponding to the predetermined area. Alternatively, for instance, when recognizing that a facility located in a circular area with a two-kilometer radius from a predetermined position is to be retrieved, the rectangular code recognizer 487 may recognize a rectangular area including the circular area. With these arrangements, the terminal unit 400 can only update the terminal base data 700 of a facility in a region retrieved by the user, so that data amount of the terminal base data 700 to be updated can be minimized.

The expiration-time information 520, 720 and the individual expiration-time information 622, 822 may not be added respectively to the base data 500, 700 and the POI lists 600, 800. With the arrangement, the information amount of the server base data 500 and the server POI list 600 can be reduced as compared to the above-described embodiment, so that the processing load of the devices 300, 400 can be reduced in transmission/reception.

The expiration-time information 520, 720 may be added only to each of the base data 500, 700, or, the individual expiration-time information 622, 822 may be added only to each of the POI lists 600, 800. Then, the POI notification controller 490 may display the POI icon Tn with the unexpired expression or with the expired expression based on the expiration-time information 520 or the individual expiration-time information 622. With the arrangement, the information amount of the server base data 500 or the server POI list 600 can be reduced as compared to the above-described embodiment, so that the processing load of the devices 300, 400 can be reduced in transmission/reception.

The POI icon Tn may be displayed with size corresponding to whether the expiration time has passed or not, e.g., an expired POI icon Tn may be displayed in size smaller than that of an unexpired POI icon Tn. With the arrangement, the user can recognize the update condition of the terminal base data 700, the possibility of nonexistence of the facility and the like based on the displayed size, which is generally easy to identify. Therefore, the terminal unit 400 can notify information about facility and the like more appropriately.

Alternatively, an expired mark such as "x" may be displayed near the expired POI icon Tn, or an unexpired mark "o" may be displayed near the unexpired POI icon Tn. Here, the expired mark and the unexpired mark correspond to expiration condition information of the present invention. With the arrangement, the user can recognize the update condition of the terminal base data 700, the possibility of the nonexistence of the facility and the like with a simple method in which each of the marks is recognized. Therefore, the terminal unit 400 can notify information about facilities and the like more appropriately.

The display rectangular area Hm may be displayed with an expression corresponding to whether the expired terminal base data 700 is included or not. As the examples of the expression, whether the expired terminal base data 700 is included or not may correspond to the display color or brightness, to the size of the display, or to the expired or unexpired mark as described above, but the arrangement is not limited thereto. With there arrangement, the user can recognize whether the display rectangular area Hm includes the expired terminal base data 700 or not.

When the scale of the travel route map 900 is a scale that is easy for the user to identify the POI icon Tn, the expression of the POI icon Tn may correspond to whether the POI icon Tn is expired or not, while when the scale of the travel route map 900 is a scale that is difficult for the user to identify, the expression of the display rectangular area Hm may correspond to whether the expired terminal base data 700 is included. With the arrangement, the user can recognize a position of the facility corresponding to the expired terminal base data 700 regardless of the scale of the travel route map 900.

The POI icon Tn may not be displayed with the expression corresponding to whether it is expired or not. In such arrangement, the POI notification controller 490, after acquiring the terminal base data 700 in Step S202, displays the POI icon Tn corresponding to the terminal base data 700 with a preset expression. Thus, the processing of Step 203 can be omitted, thus further simplifying the display processing of the POI icon Tn. Since the POI notification controller 490 may not be provided with a function for determining whether it is expired or not, thus simplifying the arrangement of the POI notification controller 490.

When the POI notification controller 490 recognizes that, for instance, a POI icon Tn is selected, POI related information 750 corresponding to the selected POI icon Tn, namely information about a name, an address or holding of an event may be displayed with an expression corresponding to whether it is expired or not. As the examples of the expression, whether it is expired or not may correspond to the display color or brightness, to the size of the display, or to the expired or unexpired mark as described above, but the arrangement is not limited thereto. The POI related information 750 may be displayed at a position corresponding to a facility on the travel route map 900 or only the POI related information 750 itself may be displayed. The POI related information 750 may be notified with an output form with sounds, corresponding to whether it is expired or not. For instance, the unexpired POI related information 750 may be notified with a women's voice, while the expired POI related information 750 may be notified with a men's voice. With the arrangement, the user can recognize the update status of the notified contents by the expression or output form of the POI related information 750. Therefore, the terminal unit 400 can notify information about facility and the like more appropriately.

The following arrangement may be employed instead of storing the server POI list 600 in the server 300. Specifically, information about the rectangular code may be added to the server base data 500. Further, the list output section 354 may retrieve the server base data 500 to which information corresponding to the rectangular code of the list request information is added. Then, based on each of the information 510, 520 of the retrieved server base data 500 and the information corresponding to the rectangular code, the server 300 may generate and transmit the server POI list 600. For instance, the server 300 may transmit each of the information 510, 520 without generating the server POI list 600. With the arrangement, the server list storage area does not have to be provided to the server storage section 340, thus simplifying the arrangement of the server storage section 340.

The POI individual information 620 may be managed with the circular area Ci. With the arrangement, when, for instance, an area is selected with a circle around the current position, which is a typical area selecting method in information retrieval, the terminal unit 400 can request distribution of only POI individual information 620 corresponding to the selected circular area. Thus, the navigation system 100 can appropriately update the minimum required number of terminal base data 700 that is not stored in the terminal base storage area.

The POI individual information 620 may be managed with an area having a shape that does not cause overlapping of areas, such as triangle and hexagon.

Without limiting to the arrangement in which the information updating device of the present invention is applied to the terminal unit 400, each of the sections 484, 487 to 490 may be independently arranged, each of the sections 487 to 490 may be independently arranged or each of the sections 487 to 489 may be independently arranged. In addition, without limiting to the arrangement in which the information distributing device of the present invention is applied to the server 300, each of the sections 354, 355 may be independently arranged.

While the functions described above are realized in the form of programs in the above description, the functions may be realized in any form including hardware such as a circuit board or elements such as IC (Integrated Circuit). In view of easy handling and promotion of the use, the functions are preferably stored and read from programs or storage media.

The arrangements and the operating procedures for the present invention may be appropriately modified as long as the scope of the present invention can be attained.

[Advantage of Embodiment]

In the embodiment described above, the terminal unit 400 of the navigation system 100 acquires the server POI list 600 corresponding to a predetermined display rectangular area Hm of the travel route map 900. In addition, when recognizing that the server POI list 600 contains the individual POIID information 621 corresponding to the terminal base data 700 that is not stored in the terminal base storage area, the terminal unit 400 acquires the server base data 500 corresponding to the POIID of the individual POIID information 621 to store it in the terminal base storage area as the terminal base data 700. With the arrangement, the terminal unit 400 does not acquire the server base data 500 stored in the terminal base storage area, but only acquires the server base data 500 that is not stored to store it as the terminal base data 700, thus minimizing the information amount of the various information to be acquired. When the contents other than the expiration time of the server base data 500 is changed due to relocation of a facility or the like, the terminal unit 400 can acquire new server base data 500 having POIID different from the old server base data 500 to store the new one as the terminal base data 700 with the content having been changed. Thus, the terminal unit 400 can store the terminal base data 700 with the contents having been changed with a simple method in which the POIID information 710 and the individual POIID information 621 are compared. Therefore, the terminal unit 400 can appropriately update the terminal base data 700.

When the server 300 of the navigation system 100 acquires the list request information containing the rectangular code corresponding to the predetermined display rectangular area Hm from the terminal unit 400, the sever 300 distributes the server POI list 600 corresponding to the rectangular code to the terminal unit 400. Then, upon acquisition of the base data request information about the POIID of the predetermined POI individual information 620 contained in the transmitted server POI list 600, the server 300 distributes the server base data 500 corresponding to the POIID to the terminal unit 400. Thus, the server 300 can distribute only the requested server base data 500 without distributing the unrequested server base data 500, so that, unlike conventional arrangements, the server 300 does not have to distribute the server base data 500 that the terminal unit 400 does not require to update, thus minimizing information amount of the various information to be distributed. When the contents other than the expiration time of the server base data 500 is changed, the server 300 can allow the terminal unit 400 to acquire new server base data 500 having POIID different from that of the old server base data 500 and to perform storage processing of the terminal unit base data 700 with the content having been changed. Thus, the server 300 can allow the terminal unit 400 to perform the storage processing of the terminal base data 700 with the contents having been changed with a simple method in which the POIID information 710 and the individual POIID information 621 are compared. Therefore, the server 300 can allow the terminal unit 400 to appropriately update the terminal base data 700.

Further, the navigation system 100 allows the terminal unit 400 to transmit to the server 300 the list request information containing the rectangular code corresponding to the predetermined display rectangular area Hm of the travel route map 900. Then, the server 300 distributes to the terminal unit 400 the server POI list 600 corresponding to the rectangular code of the list request information from the terminal unit 400. When recognizing that the server POI list 600 contains the POI individual information 620 corresponding to the terminal base data 700 that is not stored in the terminal storage section area from the server 300, the terminal unit 400 transmits the base data request information containing the POIID of the POI individual information 620 to the server 300. Then, the server 300 distributes to the terminal unit 400 the server base data 500 corresponding to the POIID of the base data request information from the terminal unit 400. The terminal unit 400 then stores the server base data 500 from the server 300 in the terminal base storage area as the terminal base data 700. With the arrangement, the navigation system 100 does not distribute the server base data 500 stored in the terminal base storage area from the server 300 to the terminal unit 400, but distributes only the server base data 500 that is not stored from the server 300 to the terminal unit 400. Thus, the terminal unit 400 acquires only the server base data 500 not stored in the terminal base storage area to store it as the terminal base data 700, thus minimizing the information amount of the various information to be transmitted/received. When the contents other than the expiration time of the server base data 500 is changed, the navigation system 100 can allow the terminal unit 400 to acquire new server base data 500 having POIID different from that of the old server base data 500 and to perform storage processing of the terminal base data 700 with the content having been changed. Thus, the navigation system 100 can allows the terminal unit 400 to store the terminal base data 700 with the contents having been changed with a simple method in which the POIID information 710 and the individual POIID information 621 are compared. Therefore, the navigation system 100 can appropriately update the terminal base data 700.

The priority application Number JP2004-350161 upon which this patent application is based is hereby incorporated by reference.

What is claimed is:

1. An information updating device for acquiring POI information about a POI from an information distribution device via a network to store the POI information in an update information storage section, the information updating device comprising:

a unique information acquirer for, upon recognition of acquisition request information for acquiring POI information of a POI located in a predetermined area on a map, outputting a distribution request information for requesting distribution of the POI information to the information distributing device and acquiring unique information of the POI information from the information distributing device in response to the distribution request information, the POI information including POI guidance information about a guidance of the POI and unique information that associates the POI guidance information with the POI and identifies not the POI but the POI information;

a selecting section for comparing the unique information acquired by the unique information acquirer and the unique information in the update information storage section to select unique information that is not stored in the update information storage section from the acquired unique information, the selecting section outputting the selected unique information to the information distributing device; and an information updating section for acquiring POI information having the unique information selected by the selecting section from the information distributing device to store the POI information in the update information storage section to update the POI information relating to POI in the predetermined area without updating a display data for displaying the map.

2. The information updating device according to claim 1, wherein the information updating section deletes POI information corresponding to the POI of the stored POI information from the update information storage section, the POI information to be deleted having been originally stored in the update information storage section.

3. The information updating device according to claim 2, wherein the information updating section retrieves unique information that corresponds to the POI existing in the predetermined area on the map and that has not been acquired by the unique information acquirer to delete the POI information containing the retrieved unique information.

4. The information updating device according to claim 1, further comprising: a notification controller for controlling a notifier to notify the POI guidance information.

5. The information updating device according to claim 1, wherein the unique information acquirer acquires a POI list storing the unique information of the POI information from the information distributing device in response to the distribution request information, the selecting section compares the unique information in the POI list acquired by the unique information acquirer and the unique information in the update information storage section, selects the unique information that is not stored in the update information storage section from the unique information in the POI list, and outputs the selected unique information to the information distributing device.

6. An information distributing device for distributing POI information about a POI stored in distribution information storage section via a network to an information updating device, the information distributing device comprising:

a unique information distributor for, upon recognition of distribution request information from the information updating device for requesting distribution of POI information of a POI located in a predetermined area on a map, distributing unique information of the POI information to the information updating device, the POI information including POI guidance information about a guidance of the POI and unique information that associates the POI guidance information with the POI and identifies not the POI but the POI information; and a POI information distributor for, upon acquisition of selected unique information selected by the information updating device from the unique information distributed by the unique information distributor from the information updating device, acquiring POI information containing the selected unique information from the distribution information storage section to distribute the acquired POI information to the information updating device without distributing a display data for displaying the map.

7. The information distributing device according to claim 6, wherein the unique information distributing device distributes a POI list storing the unique information of the POI information to the information distributing device upon recognition of the distribution request information from the information distributing device, when the POI information distributor acquires the unique information in the POI list selected by the information updating device from the information updating device, acquires the POI information having selected unique information from the distribution information storage section and distributes the POI information to the information updating device.

8. An information processing system comprising:

an information updating device for acquiring POI information about a POI via a network to store the POI information in an update information storage section; and an information distributing device for distributing POI information about a POI stored in a distribution information storage section to the information updating device via a network, the information distributing device connected to the information updating device via the network so as to transmit/receive various information, wherein the POI information includes POI guidance information about a guidance of the POI and unique information for associating the POI guidance information with the POI and identifying not the POI but the POI information, the information distributing device includes:

a unique information distributor for, upon recognition of distribution request information from the information updating device for requesting distribution of POI information of a POI located in a predetermined area on a map, distributing unique information of the POI information to the information updating device; and a POI information distributor for, upon acquisition of selected unique information selected by the information updating device from the unique information distributed by the unique information distributor from the information updating device, acquiring POI information containing the selected unique information from the distribution information storage section to distribute the acquired POI information to the information updating device without distributing a display data for displaying the map, and the information updating device includes:

a unique information acquirer for, upon recognition of acquisition request information for acquiring the POI information of the POI located in the predetermined area on the map, outputting the distribution request information to the information distributing device and acquiring the unique information of the POI information from the information distributing device in response to the distribution request information;

a selecting section for comparing the unique information acquired by the unique information acquirer and the unique information in the update information storage section to select unique information that is not stored in the update information storage section from the acquired unique information, the selecting section outputting the selected unique information to the information distributing device; and an information updating section for acquiring POI information having the unique information selected by the selecting section from the information distributing device to store the POI information in the updated information storage section to update the POI information relating to POI in the predetermined area without updating the display data for displaying the map.

9. The information processing system according to claim 8, wherein when the unique information distributor of the information distributing device recognizes the distribution request information from the information updating device, the unique information distributor of the information distributing device distributes the POI list storing the unique information of the POI information to the information updating device, when the POI information distributor acquires the unique information in the POI list selected by the information updating device from the information updating device, acquires the POI information having the selected unique information from the distribution information storage section and distributes the POI information to the information updating device, the unique information distributor of the information distributing device acquires the POI list from the information distributing device in response to the distribution request information, and the selecting section compares the unique information in the POI list acquired by the unique information acquirer and the unique information in the update information storage section, selects the unique information that is not stored in the update information storage section from the unique information in the POI list, and outputs the selected unique information to the information distributing device.

10. An information processing system comprising:

a terminal unit that acquires POI information about a POI via a network and stores the POI information in an update information storage section; and a server that is connected to the terminal unit via the network so as to transmit/receive various information, the server distributing the POI information stored in a distribution information storage to the terminal unit via the network, wherein the POI information includes POI guidance information about a guidance of the POI and unique information for associating the POI guidance information with the POI and identifying not the POI but the POI information, the server includes:

a unique information distributor for, upon recognition of distribution request information from the terminal unit for requesting distribution of POI information of a POI located in a predetermined area on a map, distributing unique information of the POI information to the terminal unit; and a POI information distributor for, when acquiring, from the terminal unit, unique information selected by the terminal unit from the unique information distributed by the unique information distributor, acquiring POI information containing the selected unique information from the distribution information storage section to distribute the acquired POI information to the terminal unit without distributing a display data for displaying the map, the terminal unit includes:

a unique information acquirer for, upon recognition of acquisition request information for acquiring the POI information of the POI located in the predetermined area on the map, outputting the distribution request information to the server to acquire the unique information of the POI information in response to the distribution request information from the server;

a selecting section for comparing the unique information acquired by the unique information acquirer and unique information in the update information storage section to select unique information that is not stored in the update information storage section from the acquired unique information, and outputting the selected unique information to the server; and an information updating section for acquiring POI information having the unique information selected by the selecting section from the server to store the acquired POI information in the update information storage section to update the POI information relating to the POI in the predetermined area without updating the display data for displaying the map.

11. The information processing system according to claim 10, wherein when the unique information distributor of the server recognizes the distribution request information from the terminal unit, the unique information distributor of the server distributes the POI list storing the unique information of the POI information to the terminal unit, when the POI information distributor acquires the unique information in the POI list selected by the terminal unit from the information updating device, acquires the POI information having the selected unique information from the distribution information storage section and distributes the POI information to the terminal unit, the unique information acquiring device of the terminal unit acquires the POI list from the server in response to the distribution request information, and the selecting section compares the unique information in the POI list acquired by the unique information acquirer and the unique information in the update information storage section, selects the unique information that is not stored in the update information storage section from the unique information in the POI list, and outputs the selected unique information to the server.

12. An information update program, stored in a non-transitory recording medium in a manner readable by a computer, operating a computer as an information updating device for acquiring POI information about a POI from an information distributing device via a network to store the POI information in an update information storage section, wherein the information updating device includes:

a unique information acquirer for, upon recognition of acquisition request information for acquiring POI information of a POI located in a predetermined area on a map, outputting a distribution request information for requesting distribution of the POI information to the information distributing device and acquiring unique information of the POI information from the information distributing device in response to the distribution request information, the POI information includes POI guidance information about a guidance of the POI and unique information for associating the POI guidance information with the POI and identifying not the POI but the POI information;

a selecting section for comparing the unique information acquired by the unique information acquirer and the unique information in the update information storage section to select unique information that is not stored in the update information storage section from the acquired unique information, the selecting section outputting the selected unique information to the information distributing device; and an information updating section for acquiring POI information having the unique information selected by the selecting section from the information distributing device to store the POI information in the update information storage section to update the POI information relating to the POI in the predetermined area without updating the display data for displaying the map.

13. An information distribution program, stored in a non-transitory recording medium in a manner readable by a computer, operating a computer as an information distributing device for distributing POI information about a POI stored in distribution information storage section via a network to an information updating device, wherein the information distributing device includes:

a unique information distributor for, upon recognition of distribution request information from the information updating device for requesting distribution of POI information of a POI located in a predetermined area on a map, distributing unique information of the POI information to the information updating device, the POI information includes POI guidance information about a guidance of the POI and unique information that associates the POI guidance information with the POI and identifies not the POI but the POI information; and a POI information distributor for, upon acquisition of selected unique information selected by the information updating device from the unique information distributed by the unique information distributor from the information updating device, acquiring POI information containing the selected unique information from the distribution information storage section to distribute the acquired POI information to the information updating device without distributing a display data for displaying the map.

14. An information processing program, stored in a non-transitory recording medium in a manner readable by a computer, operating a first computer as an information updating device for acquiring POI information about a POI via a network to store the POI information in an update information storage section and for operating a second computer as an information distributing device for distributing POI information about a POI stored in a distribution information storage section to the information updating device via a network, the information distributing device connected to the information updating device via the network so as to transmit/receive various information, wherein the POI information includes POI guidance information about a guidance of the POI and unique information for associating the POI guidance information with the POI and identifying not the POI but the POI information, the information distributing device includes:

a unique information distributor for, upon recognition of distribution request information from the information updating device for requesting distribution of POI information of a POI located in a predetermined area on a map, distributing unique information of the POI information to the information updating device; and a POI information distributor for, upon acquisition of selected unique information selected by the information updating device from the unique information distributed by the unique information distributor from the information updating device, acquiring POI information containing the selected unique information from the distribution information storage section to distribute the acquired POI information to the information updating device without distributing a display data for displaying the map, the information updating device includes:

a unique information acquirer for, upon recognition of acquisition request information for acquiring the POI information of the POI located in the predetermined area on the map, outputting the distribution request information to the information distributing device and acquiring the unique information of the POI information from the information distributing device in response to the distribution request information;

a selecting section for comparing the unique information acquired by the unique information acquirer and the unique information in the update information storage section to select unique information that is not stored in the update information storage section from the acquired unique information, the selecting section outputting the selected unique information to the information distributing device; and an information updating section for acquiring POI information having the unique information selected by the selecting section from the information distributing device to store the POI information in the update information storage section to update the POI information relating to POI in the predetermined area without updating the display area for displaying the map.

15. An information processing program, stored in a non-transitory recording medium in a manner readable by a computer, operating a first computer as a terminal unit that acquires POI information about a POI via a network and stores the POI information in an update information storage section and for operating a second computer as a server that is connected to the terminal unit via the network so as to transmit/receive various information, the server distributing the POI information stored in a distribution information storage to the terminal unit via the network, wherein the POI information includes POI guidance information about a guidance of the POI and unique information for associating the POI guidance information with the POI and identifying not the POI but the POI information, the server includes:

a unique information distributor for, upon recognition of distribution request information from the terminal unit for requesting distribution of POI information of a POI located in a predetermined area on a map, distributing unique information of the POI information to the terminal unit; and a POI information distributor for, when acquiring, from the terminal unit, unique information selected by the terminal unit from the unique information distributed by the unique information distributor, acquiring POI information containing the selected unique information from the distribution information storage section to distribute the acquired POI information to the terminal unit without distributing a display data for displaying the map, and the terminal unit includes:

a unique information acquirer for, upon recognition of acquisition request information for acquiring the POI information of the POI located in the predetermined area on the map, outputting the distribution request information to the server to acquire the unique information of the POI information in response to the distribution request information from the server;

a selecting section for comparing the unique information acquired by the unique information acquirer and unique information in the update information storage section to select unique information that is not stored in the update information storage section from the acquired unique information, and outputting the selected unique information to the server; and an information updating section for acquiring POI information having the unique information selected by the selecting section from the server to store the acquired POI information in the update information storage section to update the POI information relating to POI in the predetermined area without updating the display area for displaying the map.

16. A non-transitory storage medium for storing, in a manner readable by a computer, an information update program for operating the computer as an information updating device for acquiring POI information about a POI from an information distributing device via a network to store the POI information in an update information storage section, wherein the information updating device includes:

a unique information acquirer for, upon recognition of acquisition request information for acquiring POI information of a POI located in a predetermined area on a map, outputting a distribution request information for requesting distribution of the POI information to the information distributing device and acquiring unique information of the POI information from the information distributing device in response to the distribution request information, the POI information includes POI guidance information about a guidance of the POI and unique information for associating the POI guidance information with the POI and identifying not the POI but the POI information;

a selecting section for comparing the unique information acquired by the unique information acquirer and the unique information in the update information storage section to select unique information that is not stored in the update information storage section from the acquired unique information, the selecting section outputting the selected unique information to the information distributing device without distributing a display data for displaying the map; and an information updating section for acquiring POI information having the unique information selected by the selecting section from the information distributing device to store the POI information in the update information storage section to update the POI information relating to POI in the predetermined area without updating the display area for displaying the map.

17. A non-transitory storage medium for storing, in a manner readable by a computer, an information distribution program for operating the computer as an information distributing device distributing POI information about a POI stored in distribution information storage section via a network to an information updating device, wherein the information distributing device includes:

a unique information distributor for, upon recognition of distribution request information from the information updating device for requesting distribution of POI information of a POI located in a predetermined area on a map, distributing unique information of the POI information to the information updating device, the POI information includes POI guidance information about a guidance of the POI and unique information that associates the POI guidance information with the POI and identifies not the POI but the POI information; and a POI information distributor for, upon acquisition of selected unique information selected by the information updating device from the unique information distributed by the unique information distributor from the information updating device, acquiring POI information containing the selected unique information from the distribution information storage section to distribute the acquired POI information to the information updating device without distributing a display data for displaying the map.

18. A non-transitory storage medium for storing, in a manner readable by a computer, an information processing program for operating a first computer as an information updating device for acquiring POI information about a POI via a network to store the POI information in an update information storage section and for operating a second computer as an information distributing device for distributing POI information about a POI stored in distribution information storage section via a network, the information distributing device connected to the information updating device via the network so as to transmit/receive various information, wherein the POI information includes POI guidance information about a guidance of the POI and unique information for associating the POI guidance information with the POI and identifying not the POI but the POI information, the information distributing device includes:

a unique information distributor for, upon recognition of distribution request information from the information updating device for requesting distribution of POI information of a POI located in a predetermined area on a map, distributing unique information of the POI information to the information updating device; and a POI information distributor for, upon acquisition of selected unique information selected by the information updating device from the unique information distributed by the unique information distributor from the information updating device, acquiring POI information containing the selected unique information from the distribution information storage section to distribute the acquired POI information to the information updating device without distributing a display data for displaying the map, the information updating device includes:

a unique information acquirer for, upon recognition of acquisition request information for acquiring the POI information of the POI located in the predetermined area on the map, outputting the distribution request information to the information distributing device and acquiring the unique information of the POI information from the information distributing device in response to the distribution request information;

a selecting section for comparing the unique information acquired by the unique information acquirer and the unique information in the update information storage section to select unique information that is not stored in the update information storage section from the acquired unique information, the selecting section outputting the selected unique information to the information distributing device; and an information updating section for acquiring POI information having the unique information selected by the selecting section from the information distributing device to store the POI information in the update information storage section to update the POI information relating to POI in the predetermined area without updating the display area for displaying the map.

19. A non-transitory storage medium for storing, in a manner readable by a computer, an information processing program for operating a first computer as a terminal unit that acquires POI information about a POI via a network and stores the POI information in an update information storage section; and for operating a second computer as a server that is connected to the terminal unit via the network so as to transmit/receive various information, the server distributing the POI information stored in a distribution information storage to the terminal unit via the network, wherein the POI information includes POI guidance information about a guidance of the POI and unique information for associating the POI guidance information with the POI and identifying not the POI but the POI information, the server includes:

a unique information distributor for, upon recognition of distribution request information from the terminal unit for requesting distribution of POI information of a POI located in a predetermined area on a map, distributing unique information of the POI information to the terminal unit; and a POI information distributor for, when acquiring, from the terminal unit, unique information selected by the terminal unit from the unique information distributed by the unique information distributor, acquiring POI information containing the selected unique information from the distribution information storage section to distribute the acquired POI information to the terminal unit without distributing a display data for displaying the map, and the terminal unit includes:

a unique information acquirer for, upon recognition of acquisition request information for acquiring the POI information of the POI located in the predetermined area on the map, outputting the distribution request information to the server to acquire the unique information of the POI information in response to the distribution request information from the server;

a selecting section for comparing the unique information acquired by the unique information acquirer and unique information in the update information storage section to select unique information that is not stored in the update information storage section from the acquired unique information, and outputting the selected unique information to the server; and an information updating section for acquiring POI information having the unique information selected by the selecting section from the server to store the acquired POI information in the update information storage section to update the POI information relating to POI in the predetermined area without updating the display area for displaying the map.

* * * * *